(12) United States Patent
Zircher et al.

(10) Patent No.: US 7,562,115 B2
(45) Date of Patent: Jul. 14, 2009

(54) METHOD AND APPARATUS FOR CONNECTING A SECURE PEER-TO-PEER COLLABORATION SYSTEM TO AN EXTERNAL SYSTEM

(75) Inventors: William E. Zircher, Pepperell, MA (US); Jack E. Ozzie, Chester, NH (US); Raymond E. Ozzie, Manchester, MA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/267,646

(22) Filed: Nov. 4, 2005

(65) Prior Publication Data
US 2006/0075024 A1 Apr. 6, 2006

Related U.S. Application Data

(62) Division of application No. 10/150,757, filed on May 17, 2002, now Pat. No. 7,139,798.

(51) Int. Cl.
*G06F 15/16* (2006.01)
(52) U.S. Cl. ...................................................... 709/204
(58) Field of Classification Search ......... 709/201–207, 709/217–219, 227–232
See application file for complete search history.

(56) References Cited

U.S. PATENT DOCUMENTS

| 5,701,451 | A | * | 12/1997 | Rogers et al. ................... 707/1 |
| 5,881,232 | A | * | 3/1999 | Cheng et al. ................. 709/217 |
| 6,158,011 | A | | 12/2000 | Chen et al. |
| 6,430,602 | B1 | | 8/2002 | Kay et al. |
| 6,640,241 | B1 | * | 10/2003 | Ozzie et al. .................. 709/204 |
| 6,678,673 | B1 | * | 1/2004 | Eves et al. ....................... 707/3 |
| 6,973,618 | B2 | * | 12/2005 | Shaughnessy et al. ....... 715/513 |
| 7,139,798 | B2 | * | 11/2006 | Zircher et al. ............... 709/204 |
| 2001/0033298 | A1 | * | 10/2001 | Slotznick ..................... 345/758 |
| 2002/0023127 | A1 | * | 2/2002 | Sabeti .......................... 709/203 |
| 2002/0055974 | A1 | * | 5/2002 | Hawkes et al. .............. 709/204 |
| 2004/0205772 | A1 | * | 10/2004 | Uszok et al. ................. 719/317 |

FOREIGN PATENT DOCUMENTS

WO WO 01/06361 A2 * 1/2001
WO WO 01/27784 A1 * 4/2001

OTHER PUBLICATIONS

Lazy Instantiation, Bishop et al., JavaWorld.com, Feb. 1, 1999.*

* cited by examiner

*Primary Examiner*—Yasin M Barqadle
(74) *Attorney, Agent, or Firm*—Wolf, Greenfield & Sacks, P.C.

(57) ABSTRACT

A connection between a secure shared space and an external system is created with a connector tool. The connector tool code is included in an independent agent called a "bot" that is created by a software developer. Bots run in the background in an automated and unattended manner in a specialized enterprise integration server. Each bot has a unique identity and runs under an account assigned to the enterprise integration server. A bot can be invited to a shared space much as another collaborator. Bots can also invite others to shared spaces. All bots running in the enterprise integration server are administered by a centralized administrative control. This allows account and identity policies to be established and global behaviors, including authentication settings, startup options and scope to be determined centrally. The centralized control allows simple installation, configuration and deployment and administrative control of bot operation and access. It also allows for logging and monitoring of system behavior.

20 Claims, 13 Drawing Sheets

METHOD AND APPARATUS FOR CONNECTING A SECURE PEER-TO-PEER COLLABORATION SYSTEM TO AN EXTERNAL SYSTEM

FIELD OF THE INVENTION

This invention relates to secure peer-to-peer collaboration systems in which collaboration data is contained in a secure shared space and to methods and apparatus for securely providing access from the shared space to applications, services and data that are external to the shared space.

BACKGROUND OF THE INVENTION

Collaboration involves the ability for each member in a group of members, called "collaborators" to automatically transmit information to, and receive information from, other collaborators in the group. In order to facilitate such collaboration, various systems have been developed that allow such information to be transmitted between personal computer systems, communication appliances or other communication devices, including handheld and wireless devices. Collectively, these devices will be referred to a "computers" in this description.

Computer-based collaboration may occur over a network, such as the Internet, wherein each of the users is located at a computer connected to the network. One collaboration model currently in use is a "peer-to-peer" model in which direct connections are established over the network between each of the collaborator computers. Information generated by each collaborator is then sent directly to each other collaborator.

When peer-to-peer collaboration systems send information over the Internet, additional care must be taken to insure that the communications are secure. While the Internet is ideally suited for collaboration because it has the ability to connect widespread users with diverse hardware and software, communication over the Internet is not generally considered secure because messages sent over the Internet are typically funneled to third-party infrastructure where communications can be intercepted and confidences violated. Consequently, in peer-to-peer collaboration systems that use the Internet, the collaboration data is typically contained within private shared spaces on each computer. Security is maintained by carefully controlling access to these spaces and checking identities of collaborators and by encrypting all communications that pass over the Internet between collaborators.

The latter type of collaboration system is described in detail in U.S. patent application Ser. No. 09/357,007, now U.S. Pat. No. 6,640,241, issued, Oct. 28, 2003, entitled METHOD AND APPARATUS FOR ACTIVITY-BASED COLLABORATION BY A COMPUTER SYSTEM EQUIPPED WITH A COMMUNICATIONS MANAGER, filed Jul. 19, 1999 by Raymond E. Ozzie, Kenneth G. Moore, Robert H. Myhill and Brian M. Lambert; U.S. patent application Ser. No. 09/356,930, now U.S. Pat. No. 6,446,113, issued Sep. 3, 2002, entitled METHOD AND APPARATUS FOR ACTIVITY-BASED COLLABORATION BY A COMPUTER SYSTEM EQUIPPED WITH A DYNAMICS MANAGER, filed Jul. 19, 1999 by Raymond E. Ozzie and Jack E. Ozzie; U.S. patent application Ser. No. 09/356,148, now U.S. Pat. No. 6,859,821, issued Feb. 22, 2005, entitled METHOD AND APPARATUS FOR PRIORITIZING DATA CHANGE REQUESTS AND MAINTAINING DATA CONSISTENCY IN A DISTRIBUTED COMPUTER SYSTEM EQUIPPED FOR ACTIVITY-BASED COLLABORATION, filed Jul. 19, 1999 by Raymond E. Ozzie and Jack E. Ozzie and U.S. patent application Ser. No. 09/571,851, now U.S. Pat. No. 6,986,046, issued Jan. 10, 2006, entitled METHOD AND APPARATUS FOR MANAGING SECURE COLLABORATIVE TRANSACTIONS, filed May 12, 2000 by Walter E. Tuvell and Nimisha Asthagiri.

In such peer-to-peer collaboration systems, local data copies are stored on each collaborator's computers and each collaborator gesture or action is duplicated in the local object store of each member's machine. For example, assume that a map is displayed on all collaborators computer. When one collaborator draws a circle on the map, that computer sends a message to the other computers to draw the same circle on the maps in their shared spaces. The system does not need to resend the entire edited map, but rather only the change to the map.

There is often a need for one or more of the collaborators to access an application, system or service that is external to the shared space and may reside on a local device or elsewhere on the network. For example, a collaborator may want to access a Web page on the Internet. In this case, the collaborator enters a URL into a Web browser that is part of the collaboration system and submits the information to the Internet. The collaboration system then sends a message to the other collaborators to cause them to perform the same action. In this case, each of the collaborators individually connects to the Web site and downloads the selected Web page directly into his or her shared space. Such an arrangement is called "multipoint access."

However, in other cases, members of a shared space need access not to external Web-based information, but rather to internal server-based information residing in customer relationship management systems, enterprise resource planning systems, document and knowledge management systems, etc. For example, a consulting team working together with a collaboration system might need access to customer history, current pricing schedules, or best practices guidelines. In such a case, it would be inefficient for multiple members to make independent calls to the centralized server because the server would have to process the same request and provide the same result multiple times. In addition, each computer would require an installed interface with the internal database application and would have to be configured, potentially with extremely sensitive password information that is generally considered inappropriate outside of the enterprise firewall.

Another common customer example uses the reverse relationship: the members of a shared space have created or modified content (e.g., updated a customer record, amended a best practices document with new knowledge). These changes now need to be captured, managed and shared centrally by the appropriate server-based system(s). Again, it would be inappropriate for multiple members of the space to send the single change.

Thus, it would be useful to be able to connect shared spaces to an external application, system or service from a single point in the shared space. It would also be useful to create shared spaces from an external application, system or service and to be able to move data between the shared space and the external system either unidirectionally or bi-directionally. However, in all cases, it is important to insure that such a connection does not compromise the security of the shared space.

Further, it is also desirable that the mechanism that is used to establish the connection be operable with different interfaces and protocols. For example, a connection between a shared space and an external system could be established via interfaces, such as Microsoft Transaction Server, or Microsoft Message Queue or via SOAP for systems that expose objects through Extended Markup Language (XML.) Other protocols such as HTTP or FTP could also be used.

SUMMARY OF THE INVENTION

In accordance with the principles of the invention, a connection between a shared space and an external system is created with a connector tool. In one embodiment, the connector tool code is included in independent software agent code called a "bot" that is created by a software developer. The Bot code runs in the background in an automated and unattended manner in a specialized "enterprise integration server." Bots execute tasks from a single point rather than from within the shared space of each collaborator, an advantage if the task requires resources that are not available to all devices. In addition, task execution can be distributed over a cluster of integration servers and devices.

Bots are installed with, or assigned to, a unique identity that is designated to perform a series of tasks. This identity is called a "service." Services are housed under a single account assigned to the enterprise integration server called a "cluster controller" account. A service can be invited to a shared space much as another collaborator. When a collaborator invites a service identity to a shared space, the service appears in the collaborator's shared space member list (member presence information is projected in a manner similar to any standard member provided the administrator has configured the service accordingly) and the bots housed by the service perform their assigned tasks. Bots can also invite others to shared spaces.

In still another embodiment, all bots running in the enterprise integration server are administered by centralized administrative control using a server console program in the server. This centralized control allows account and identity policies to be established and global behaviors, including authentication settings, startup options and scope to be determined centrally. The centralized control allows simple installation, configuration and deployment and administrative control of bot operation and access. It also allows for logging and monitoring of system behavior. In particular, the integration server provides a cluster console through which server administrators configure and manage a server cluster. A cluster consists of one or more integration servers (nodes) which host a set of services.

The console, which is installed with the integration server application, enables administrators to create an integration server cluster account and a password phrase that can be changed when necessary and to create integration server cluster nodes. The console further allows administrators to configure policies to promote secure cluster account activities. For example, administrators can set policies to control publication of service contact information and to identify collaboration components that can be downloaded via these services. The console also permits administrators to create bot services that house bots which automate interaction between collaborators and third-party applications, to install and configure bots and to manage bot activities.

BRIEF DESCRIPTION OF THE DRAWINGS

The above and further advantages of the invention may be better understood by referring to the following description in conjunction with the accompanying drawings in which.

DETAILED DESCRIPTION

Figure 1:
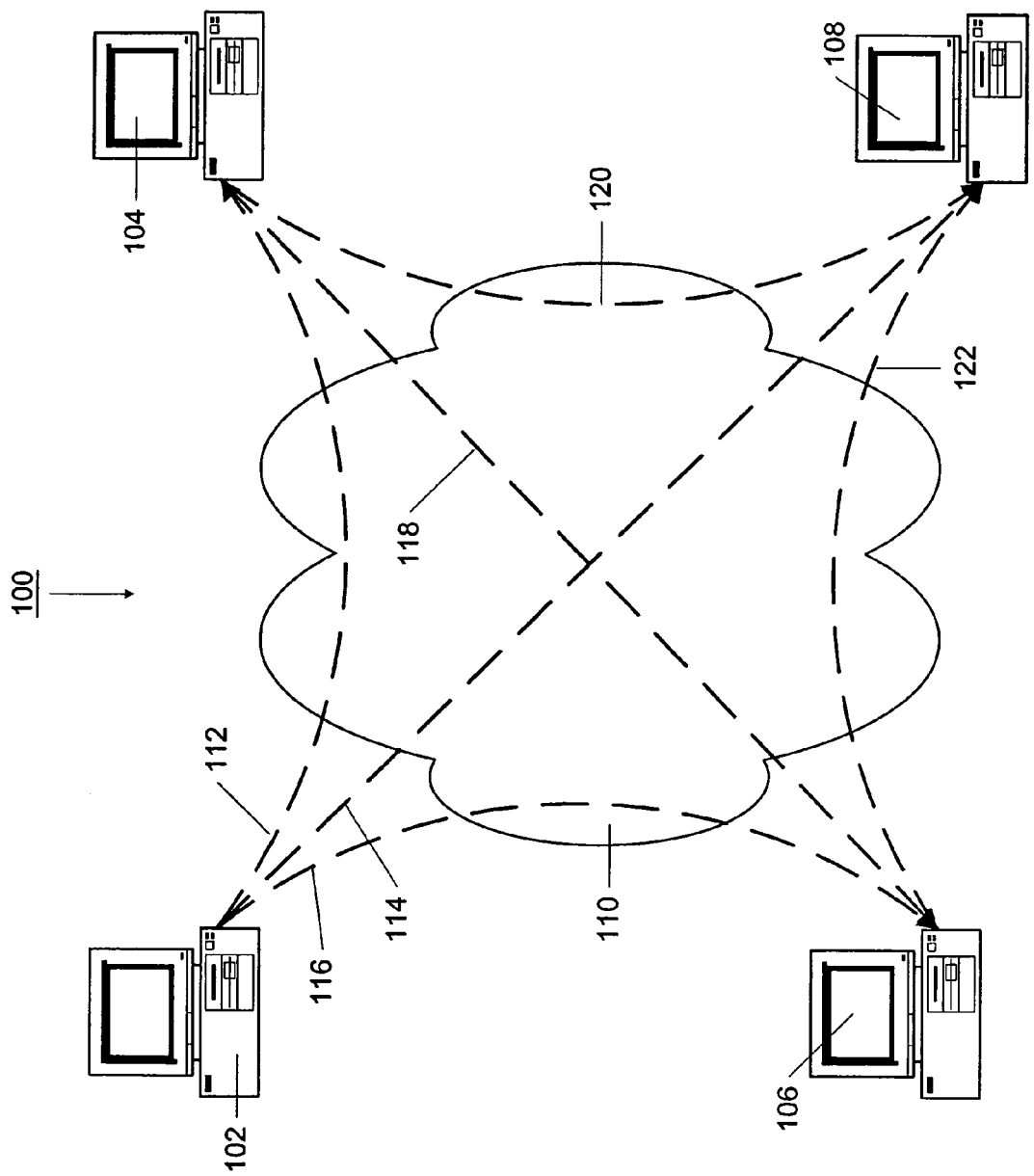
FIG. 1 is a block schematic diagram of an illustrative prior art collaboration system with which the invention can run.

FIG. 1 illustrates, in a very schematic form, a peer-to-peer collaboration system 100 in which collaborating computers are connected to each other by a network 110, such as the Internet. Although various networks can be used with such a system, in the discussion below, the network 110 is assumed to be the Internet. In this system, the collaborating computer systems constitute peer units 102-108, and communications through the Internet 110 can be directed from one peer unit to another, without intermediaries. Each peer unit 102-108 can be implemented as a personal computer or other form of network-capable device, such as a set top box or hand-held device.

Peer-to-peer communications can be made directly between peer units. For example, peer unit 102 may communicate directly with peer units 104, 106 and 108, as indicated schematically by dotted links 112, 116 and 114, respectively. In a similar manner, peer unit 104 can connect to units 108 and 106 via connections 120 and 118, respectively. Finally, units 106 and 108 can communicate over connection 122. A collaboration system such as that shown in FIG. 1 is available from Groove Networks, Inc., 100 Cummings Center, Suite 535Q, Beverly, Mass. 01915 and is described in detail in the Groove™ Developer Pack which is available from Groove Networks, Inc. and on-line at the company's website. In the discussion below, the collaboration system will be assumed to be such a system. However, it will be apparent to those skilled in the art that other collaboration systems could also be used with the present invention.

In this collaboration system, a program called an "activity" is resident in each collaborating computer system, communication appliance or other network-capable device. The activity allows a shared, focused task, such as, for example, a "chat", gaming, or business application, to be performed in collaboration with other, remotely-located collaborators.

This collaboration involves shared and mutual activities between individuals and small groups in private shared spaces. Each shared space is an instantiation of one or more activities operable on each of the collaborating computers of members of that shared space.

In the system, participants or members of a shared space access the system by opening "accounts" that are associated with "endpoints." Since an individual collaborator may access the system via more than one device, an endpoint is defined as a unique combination of an individual and a device. Each endpoint stores an individual, local copy of the shared space data.

Each activity includes one or more tools, each of which interacts with a collaborator, for example, by receiving mouse and keyboard events, and initiates data change requests in response to the interactions. These data change requests are used locally and sent to other members of the shared space. Each activity also includes one or more data-change engines, separate from the tools, for maintaining the local copy of the shared space data pursuant to a common data model. The data model is, for example, activity-specific, and preferably the same over all members of the shared space. Each collaborating computer also includes a dynamics manager, that examines data change requests generated locally and received from other shared space members and coordinates the execution of the local and other data change requests and directs the data-change engine to make the requested changes to the local copy of data.

Figure 2:
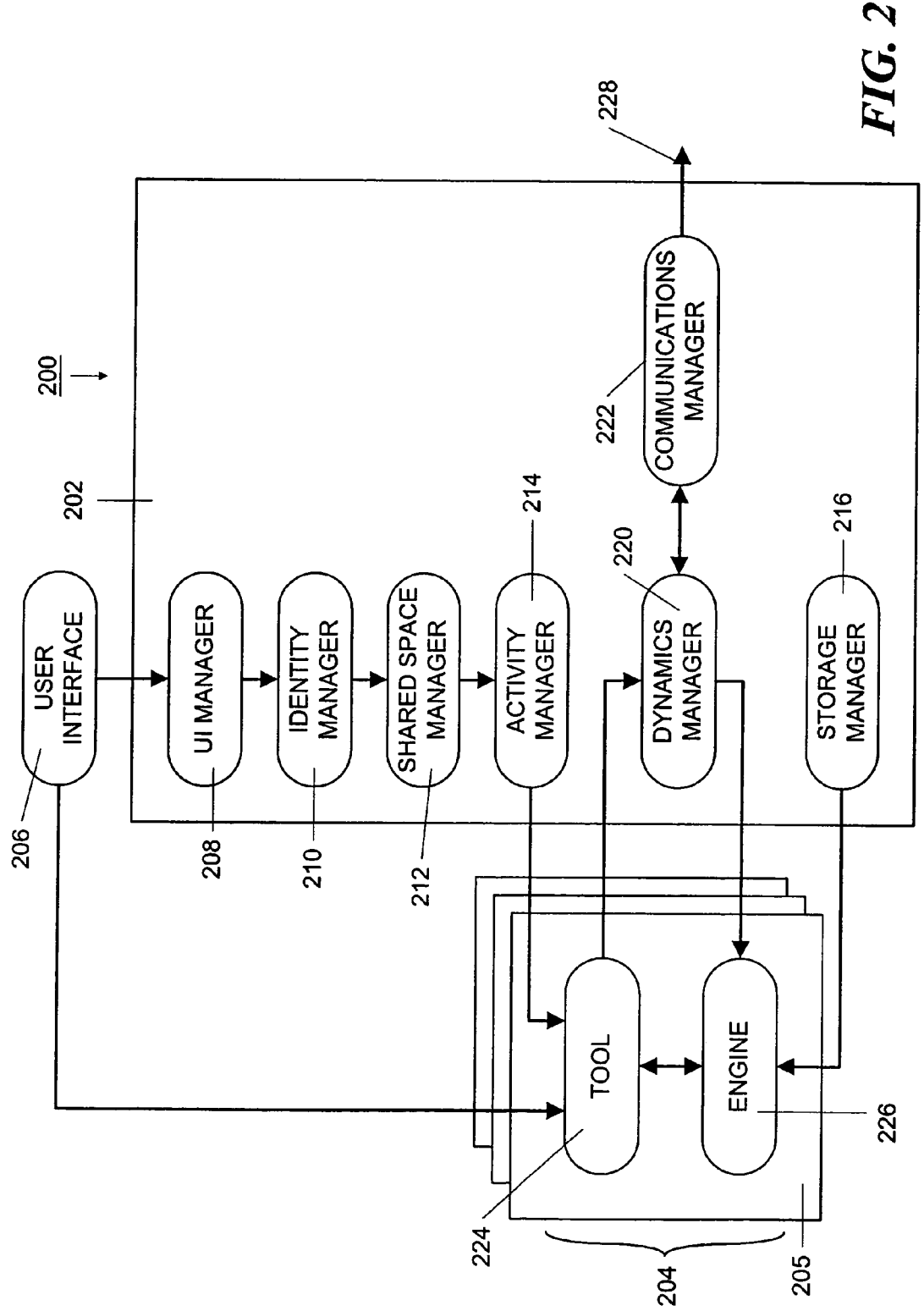
FIG. 2 is a more detailed block schematic diagram of the prior art collaboration system running on a device of one collaborator.

FIG. 2 shows, in more detail, the internal architecture 200 of the collaboration system as implemented on one of the peer units 102-108, such as, for example, peer unit 102. The collaboration system on peer unit 102 includes a framework 202, at least one shared space 204 instantiating one or more activities 205, and a user interface 206.

The framework 202 can provide a platform for servicing a number of shared spaces, of which shared space 204 is shown. The framework 402 preferably is of modular construction, with an application programming interface (API) on which the activities run and through which they communicate with framework components. The framework 202 includes a user interface manager 208, an identity manager 210, a shared space manager 212, an activity manager 214, a storage manager 216, a dynamics manager 220, and a communications manager 222.

The user interface (UI) manager 208 is responsible for managing shared services for a number of user interface controllers (not separately shown). The UI manager 208 manages the graphical layout of activity screen displays within panes of a display window, and otherwise provides a desired "look and feel" for the user interface. The UI manager 208 also manages activity navigation (for example, go to, next, previous, etc.) and maintains a navigation history.

The identity manager 210 is responsible for maintaining an "identity" for each shared space member. An identity is the name, and corresponding uniform resource locator (URL), by which each user is known by others. Individual users may have one or many identities. The identity manager 210 maintains a record or table, in the local storage of the identities. The identity manager 210 can also maintain a record or table of URLs for the shared space members and their corresponding device URLs. Alternatively, a separate member manager can be implemented.

The shared space manager 212 is responsible for managing each of the shared spaces 204 that may be opened on the peer unit 102. Each shared space 204 is an instantiation of one or more activities. Each shared space 204 has a corresponding activity manager 214.

Each activity manager 214 is responsible for (a) adding new activities to a shared space, (b) opening existing activities in a shared space, and (c) updating shared space activities. Each activity is defined by an activity "template" that defines the initial activity configuration for a shared space and is a persistent representation of the tool and engine components comprising the activity. In order to create an activity template, a software developer may write a tool or adapt an existing tool and engine for use within the framework. For example, an activity template can be distributed as shrink-wrapped software or downloaded over the Internet to peer unit 102 from a remote server. Activity components can be regarded as Web documents and are represented persistently via URLs. The activity template itself preferably has a URL, which allows for tracking activity design changes. The activity template can be a single activity template or an activity collection template. A single activity template pertains to only one activity, such as "chat". An activity collection template pertains to a collection of activities, such as "chat and outline".

To add a new activity, the activity manager 214 is provided by the means described above with the URL of a template for the new activity. In order to open the new activity or an existing activity, the activity manager opens the template, extracts the template information (such as component URLs) and propagates the information into the shared space. A collaborator may add additional activities to the shared space 204 as needed. After being added, an activity is "part of" the shared space and visible to all shared space members and each shared space member has an activity template for the shared space available on his or her peer unit.

Each shared space, such as shared space 204 has a tag to identify its corresponding activity manager 214 and to bind the activity manager with data associated with the activity. Preferably, the data is located in a document in the local memory and each document has a local registry linked to it with tag names maintained in the registry to express a mapping (reference pointers or associations) in an extensible, platform-independent way, between the document and its corresponding shared space.

Each activity, such as activity 205, includes a tool, such as tool 224 and an engine, such as engine 226. The tool 224, in conjunction with the user interface 206, allows an activity to interact with a collaborator. For example, the tool may receive user interface events, such as keyboard or mouse events, generated when the user interacts with the user interface 206. In response to such user interface events, the tool 224 may make data change requests to its corresponding engine 226. Tool 224 also implements APIs for interacting with background services.

The engine 226 is responsible for maintaining and changing the data that supports the shared space 204 and/or results from user interaction obtained through the tool 224. It responds to data change requests from tool 224 by returning to the tool 224 commands necessary to implement the data change requests. Under the direction and control of the dynamics manager 220, the engine 226 can make changes to the shared space data copy that is stored locally under control of the storage manager 216. When these changes are made, the engine 226 asynchronously generates data change notifications. The tool 224 can subscribe to the engine 226 to receive these data change notifications so that the tool 224 can update the user interface asynchronously when the data changes occur.

The dynamics manager 220 receives local data change commands from the tool 224 and receives data change commands from other collaborating computers, via communication manager 222 from a network connection 228. Dynamics manager 220 makes decisions on which commands to implement in order to maintain synchronization among all collaborators and forwards these commands to engine 226 in order to cause engine 226 to make changes to the local data copy.

During operation the collaborative system 200 obtains a member's identity from the identity manager 210 and opens a shared space manager 212. The system 400 then requests that the shared space manager 212 open a shared space identified via a URL and create an activity manager 214. Once created, the activity manager 214 opens an activity, typically by using the activity's URL to identify the activity. Then, the collaboration system 200 is ready for members to use the shared space to perform the shared, focused tasks offered by the particular activity.

The system illustrated in FIGS. 1 and 2 has the advantage that access to the shared space can be controlled by using a security framework that limits access to the shared space and encrypts all communications passing between collaborators. Such a security framework is described in detail in the aforementioned U.S. patent application Ser. No. 09/571,851. Thus, all data for each application resides exclusively in the shared space. However, as mentioned previously, there are circumstances where the capabilities of the collaborative system can be extended by connecting the shared space to an external system and exchanging data between the shared space and the external system. In some cases, it may be necessary to exchange data through a firewall. One method of creating such a connection is shown in FIG. 3.

Figure 3:
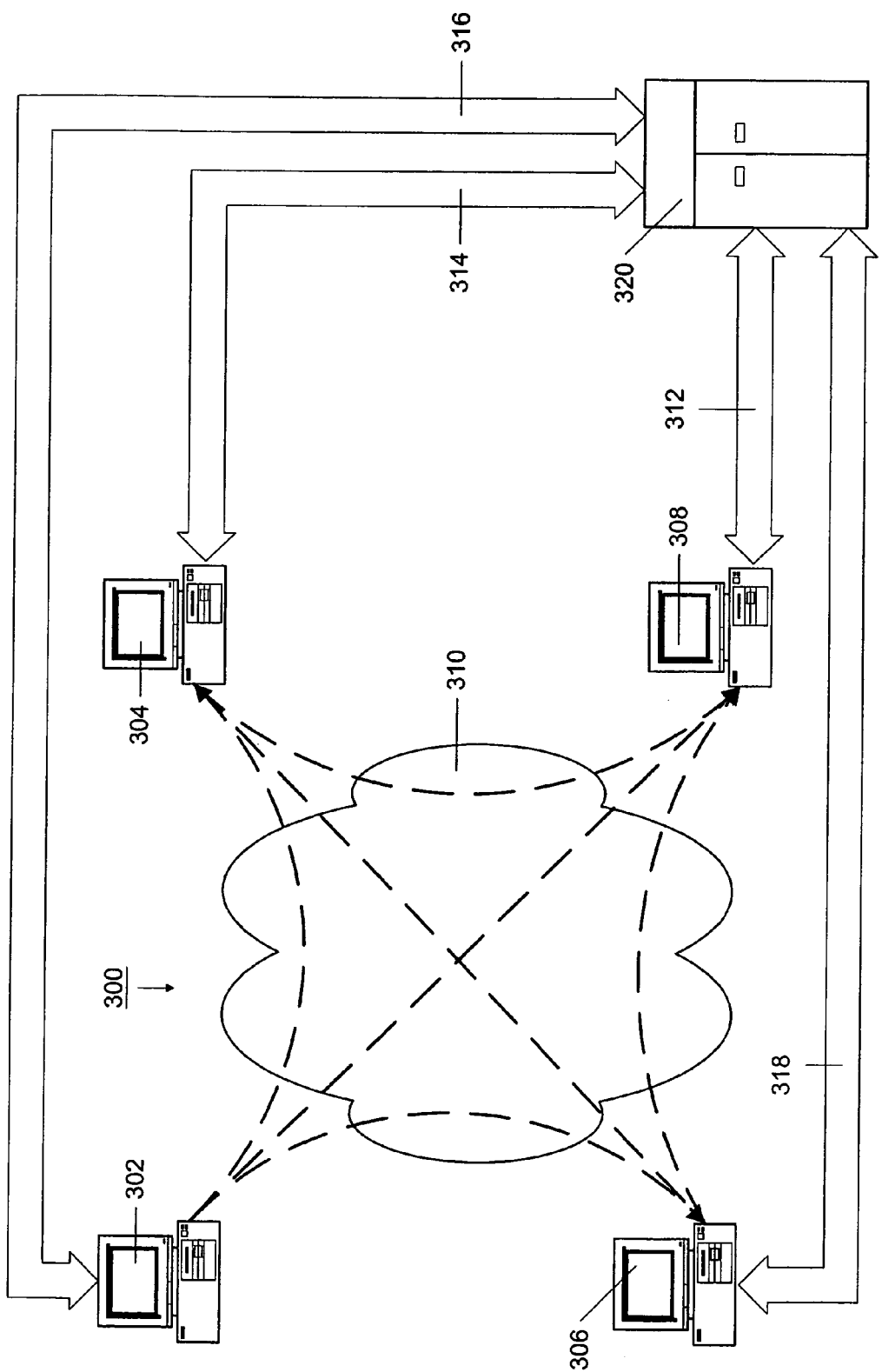
FIG. 3 is a block schematic diagram of a multiple point integration system allowing a plurality of collaborators to access an external system.

FIG. 3 shows a collaboration system 300 with four collaborating computers 302-308 that are connected by a network 310. Each of the collaborating computers 302-308 incorporates a connector tool 312-318 that connects it to an external system 320. Although the connector tools 312-318 are shown as direct connections between computers 302-308 and external system 320, the connection could be accomplished via a network, such as network 310. Each connector tool, such as tool 312, is constructed like other tools and contains code that connects the shared space 300 to an external application or system 320 that may reside on a local device 302-308 or elsewhere on the network 310.

Connector 312 may be instantiated dynamically as a result of an interaction within an external application. For example, a new shared space containing a connector tool can be created as the result of an external application behavior. In other words, the connector tool can be "context-sensitive." The connector 312 can move data in a unidirectional or bi-directional way so that data is imported to the shared space in support of context for member interaction. The data exchange with the external application or system can occur dynamically as needed, either on a one-time basis or ongoing. A connector tool, such as tool 312, can operate on one or more shared spaces including the shared space in which connector tool resides. Other shared spaces within an account can "run in the background."

Connector tools communicate directly with the external application or system using standard interfaces. These interfaces can include Microsoft Transaction Server, an application that runs under IIS and maintains pool of ODBC connections. Another possible protocol is Microsoft Message Queue, which can integrate with IBM MQ series. For communication with servers that expose objects through XML, the SOAP protocol can be used. Another possible protocol is hypertext transfer protocol (HTTP) protocol.

Connector tools, such as connector tool 312, can be used for synchronizing a calendar tool in the shared space 300 with an external calendar, such as a Microsoft Outlook™ calendar or Palm Pilot™ calendar. A connector, such as connector 312 can also be used to connect the shared space 300 to a knowledge management archive or to export a collaborative discussion to an external corporate knowledge management system. A connector tool can also allow a collaborator to interact with a customer in the shared space, using data imported from a CRM system and publishing back to CRM on an incident state change.

With connector tools, every member 302-308 of the shared space 300 can move data between the shared space 300 and the external systems 320 because a connector tool runs at every endpoint. This system works well when the endpoints retrieve data, for example, from a web server. However, there are certain inconveniences with such an arrangement. For example, it is essential that each member have the ability to properly authenticate with the external system and have any necessary rights to perform the desired action (read/write). In addition, there is high administrative and management resource overhead because necessary drivers and/or other required software must installed and maintained at each device. Further, there are heavier loads on external system because multiple contacts are made. In systems where members write data to the external system, data conflicts at the external system can exist.

In accordance with the principles of the present invention, the connector tool and interfaces to the external system are run at a single endpoint. The use of a single endpoint effectively reduces administrative overhead because only one client requires access rights to the external system. Since only one endpoint has access to the data, a single endpoint system minimizes the potential for data conflicts at the external system.

Figure 4:
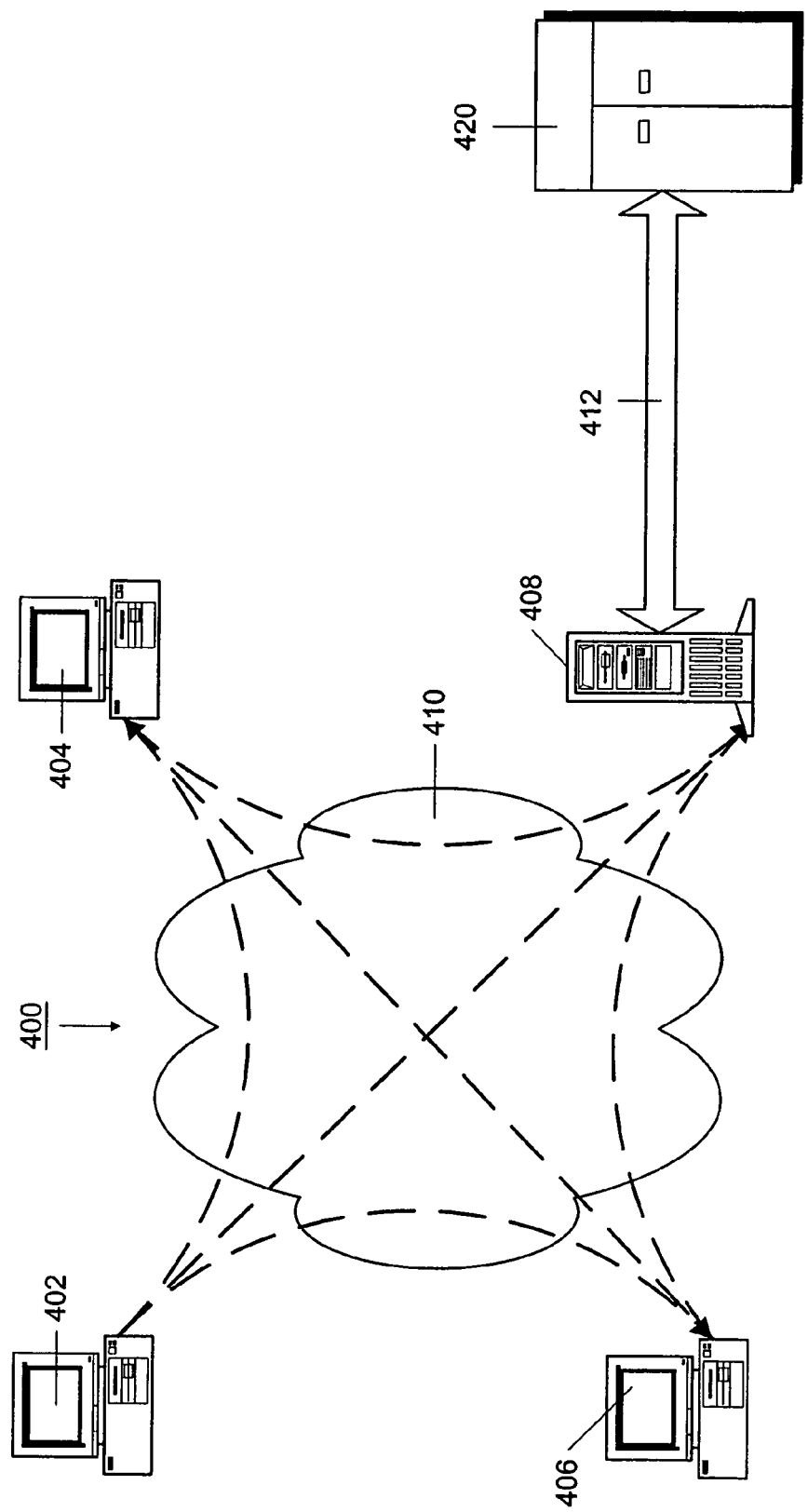
FIG. 4 is a block schematic diagram illustrating multiple collaborators accessing an external system by means of an enterprise integration server.

An illustrative example of a single endpoint system is shown in FIG. 4. In this system each connector tool, such as connector tool 412 is run by an agent program called a "bot" (not shown in FIG. 4). The bots, in turn, run in a specialized "enterprise integration server" 408 that has access to the shared space 400. The use of a separate server for the bots allows the bots to be instantiated and configured by a central administrative console facility.

Figure 5:
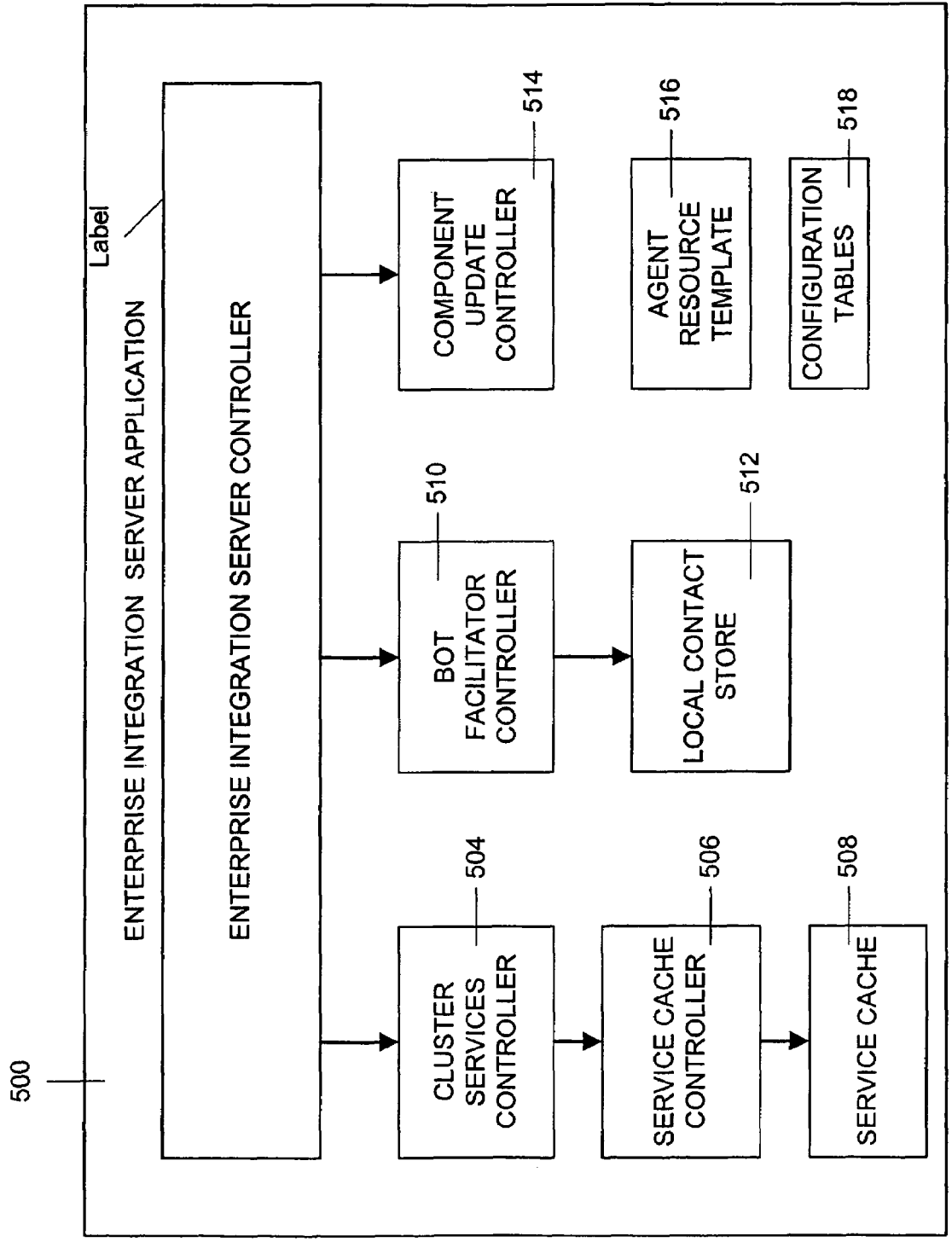
FIG. 5 is a block schematic diagram illustrating the overall architecture of an enterprise integration server constructed in accordance with the principles of the invention.

A high-level view of the internal architecture of the enterprise integration server 500 is shown in FIG. 5. Overall control of the server is provided by the groove enterprise integration server controller 502. This component initializes system services and maintains these services for the process lifetime. It also coordinates with the operating system to enable messaging and logging to take place in the operating system. The server controller 502 also enables inter-process communications, allowing calls into server from external processes and provides data upgrade facilities for cluster node and service definitions. The server controller 502 operates with three other controllers: the cluster services controller 504, the bot facilitator controller 510 and the component update controller 514.

The cluster services controller 504 implements a server control console which manages all aspects of server user interface. This component is also responsible for coordinating the startup and shutdown of each cluster node. The component also implements a cluster services facility which controls all aspects of cluster nodes and implements cluster node election services which control resource allocation and balancing. The cluster services controller also operates with a bot service cache controller 506 that maintains all services running in the cluster and coordinates startup and shutdown of all services. The bot service cache controller 506, in turn, maintains a service cache 508 that holds an entry for each service as discussed below.

The bot facilitator controller 510 manages the local contact store 512 and maintains the integrity of an access control list (ACL) that controls access to the services. The bot facilitator controller 510 also supports bot service publishing capabilities. Finally, the component update controller 514 provides a facility that defines node auto-update behavior and enables unattended installation of new software on cluster.

In order to perform tasks with the enterprise integration server 400, services are created and one or more bots are assigned to each service. Each service is the equivalent of a collaboration system member and, therefore, has a unique identity. In order to interact with the collaborators, services may be invited to shared spaces, or may invite other collaborators to shared spaces. When a service is invited to a shared space, the collaborators are made aware of the service, but are not made aware of the bots that actually implement the service.

Each bot comprises software code that runs in background mode in a continuous, automated and unattended fashion on the enterprise integration server. Bots can monitor one or more shared spaces, "work with" specified tools and perform actions. The bot code can contain connector code for accessing external systems, applications or services. All bots run under a single enterprise integration server account in the enterprise integration server. Bots obey the access control framework of the collaboration system and can initiate or respond to events generated within either the external system or any shared space with which they operate. Bots use framework services and the bot code resides on the enterprise integration server, separate from the shared spaces with which the work.

Bots can perform numerous functions and repetitive tasks. For example, a bot could watch stock prices and send out instant messages when thresholds are reached. Another bot could scan a CRM tool in multiple shared spaces for issues that have not been resolved in a specified time period. Other bots could archive data stored in a shared space to an external repository or generate part requests when inventories in back-end systems are depleted. Some bots could automatically invite users to shared spaces and create responses to customer questions by matching frequently asked questions to data using keywords.

There are four classes of bots: scheduled bots, agent bots, tool bots and bootstrap injector bots. Startup bots comprise a single instance that is instantiated at a scheduled time, for example, when the server starts. Agent bots require only the minimal interfaces needed to support bots. An agent bot is the most efficient bot and uses the least amount of memory, but has access to the fewest services. The tool bot, while slightly more resource intensive, has access to all features available to standard tools, including connection points, the component container, etc. The tool bot is less efficient that the agent bot, it is more efficient than a tool running in the collaborative framework and requires less system resources. The bootstrap injector bot is a specialized bot that is initialized by injecting a tool directly into a shared space and then using the tool initiation code to start the bot on the enterprise integration server.

Bots are created by developers and can be written in various languages including Visual Basic and C++. Various scripting languages, such as JavaScript and VBScript can also be used. A developer must write the bot code to include the knowledge of the tool with which the bot is to work, the trigger conditions and the actions to perform. The developer must then describe the bot by creating a bot template file (designated by a .tpl extension). This file identifies compiled code components, if the bot is implemented in a compiled language, or contains script code, if the bot is implemented in script. The developer must also describe the bot dependencies and libraries in an osd file that follows the same conventions as a tool template osd file. For the exemplary collaboration system, these conventions are explained in detail in the aforementioned GDK document.

Finally, the developer must provide the configuration options that an administrator can choose when the bot is configured and the developer may also provide a user interface with which the administrator can interact. These options are provided in an XML bot configuration file. The options determine what tools the bot is associated with and, optionally, provide a configuration user interface for the administrator. A sample XML bot configuration file follows:

```
<BotInstallations>
    <BotInstallation
    SignatureType="0"
    Active='1'
    Class="1"
    AgentTemplateResourceURL="http://components.groove.net/Groove/
        Components/Root.osd?Package=net.groove.Groove.Tools.Business.
        Bots.GrooveElizaBot_TPL&Version=2&Factory=Open"
    DisplayName="Classic Eliza Chatter Bot 2"
    MinScope="2"
    MinTelespaceRole="1">
        <ActivationDescriptors>
            <ActivationDescriptor
                IncludeInvisible="1"
                SignatureType="0"
                ToolConnectionType="0"
                Signature="http://components.groove.net/Groove/
                    Components/Root.osd?Package=net.groove.
                    Groove.Tools.General.Discussion.
                    DiscussionTemplate_TPL&Version=3&
                    Factory=Open"
            />
```

```
            <ActivationDescriptor
                IncludeInvisible="1"
                SignatureType="0"
                ToolConnectionType="0"
                Signature="http://components.groove.net/Groove/
                    Components/Root.osd?Package=net.groove.
                    Groove.Tools.General.Discussion.
                    DiscussionTemplate_TPL&Version=2&
                    Factory=Open"
            />
        </ActivatorDescriptors>
    </BotInstallation>
</BotInstallations>
```

This example illustrates a bot with two tool signatures. If there are additional implementations of a bot or more than one tool signature, additional <BotInstallation> statements can be added.

In the above example, the bot installation "class" specifies the bot class and takes an integer value, such as: Class=0, Agent; Class=1, Tool; Class=2, Scheduled; Class=3, Bootstrap. The bot installation "signature type" specifies the mechanism that will be used to find the tool when a service is invited to a shared space. In particular, many tools are constructed by means of an XML template document that contains information from which the tools inherit their behavior. This XML template document is called a "template resource" and is identified by a template resource URL. A template resource may contain one or more XML attributes called "support types" and may be installed in the shared space with an attribute called "category".

The signature type takes an integer value, such as:

SignatureType=0, GrooveBotSignatureType_PACKAGE, indicates that the tool should be located by matching the tool template resource URL.

SignatureType=1 GrooveBotSignatureType_CATEGORY, indicates that the tool should be located by matching the tool by category SignatureType=2 GrooveBotSignatureType_STARTUP, indicates that no matching is required. This signature type can be used for startup bots. A startup bot can be either an agent bot or a tool bot.

SignatureType=3 GrooveBotSignatureType_SCHEDULED, indicates that no matching is required. This signature type can be used for scheduled bots.

SignatureType=4 GrooveBotSignatureType_SUPPORTEDTYPE, indicates that the tool should be located by matching the tool by a supported type.

The tool signature specifies a value of the specified type that will be used for matching purposes. For example, if the signature type specifies matching the tool by resource URL, then the signature should specify the resource URL. The match is tested using the same rules as those used for tool templates. These rules are discussed in detail in the Groove Developers GDK set forth above. If the signature type specifies matching by supported type, then the configuration file specifies the supported type in the "signature" value. For example, if the tool template contains the following supported type:

```
<!-- Supported Type Definitions -->
<g:SupportedTypes>
    <g:SupportedType Name="urn:yourcompany.com:YourApp10"/>
</g:SupportedTypes>
``` then the BotInstallation section should specify:

SignatureType="4"

Signature="urn:yourcompany.com:YourApp10"

The MinScope value limits the scope to the specified value and takes an integer value, such as:

MinScope=0 bot scope includes all shared spaces and tools

MinScope=1 bot scope includes all tools in a shared space

MinScope=2 bot scope includes all components in a tool

MinScope=3 bot scope includes a single component

If a MinScope of 0 is specified, then the service administrator can choose to have a single instance of the bot that has a scope of all shared spaces and tools or can specify that multiple instances of the bot should be created, one for each component or tool. If a MinScope of 3 is specified, the administrator can only specify multiple instances of the bot, one for each component. The administrator cannot specify that a single instance of bot will have a scope of greater than a single component.

Since tools in the aforementioned Groove collaboration system are hierarchical in nature and a tool can contain other tools or tool sets, it is necessary to inform the system scanning mechanism whether to just look at the tool container, or whether it will be necessary to examine the tool container and sub-containers to discover other tools contained within the tool. This is done by using the bot connection type value. The ConnectionType value specifies the kind of connection that the bot makes with the tool and takes an integer value, such as:

ConnectionType=0 connect to the tool's data model delegate

ConnectionType=1 connect to the tool's connection delegate

ConnectionType=2 connect to the data model delegate of a subtool specified through another mechanism The MinTelespaceRole value specifies the minimum role required for the bot to be instantiated in a shared space. There are two minimum roles: the bot service configuration minimum role, which determines whether the bot service accepts the invitation to the shared space and the bot installation minimum role, which determines whether the bot service creates an instance of the bot for a tool in the shared space. The bot service minimum role is set by the service administrator using a bot configuration user interface. The bot installation minimum role is set by the bot developer in the bot installation section of the bot configuration file and can be further restricted by the service administrator. The MinTelespaceRole takes an integer value, such as:

MinTelespaceRole=0 may be invited as guest

MinTelespaceRole=1 Must be invited as at least a Participant

MinTelespaceRole=2 Must be invited as a Manager

Bots run under centralized administrative control in the enterprise integration server so that global policies and behaviors can be defined at this level. Global behaviors that are defined centrally include authentication settings, auto accept policies, administrative confirmation behaviors, API confirmation behaviors, startup options and the scope of bot instances. Centralized control allows simple installation, configuration and deployment of bots, control of bot operation and access control and further allows logging and system behavior administration.

Bot instances can also be configured at the centralized enterprise integration server. In general, the aforementioned XML configuration files are used by a service administrator to define bot instance behaviors and tool signature(s) and to monitor activity. At the centralized enterprise integration server, bots can be directly controlled. This control includes which bot component to instantiate, whether the bot should be enabled or disabled, the bot instance termination behavior and the software code class (lightweight to heavy weight.) In order to configure the bots, the administrator uses the server console interface as described below.

Figure 6:
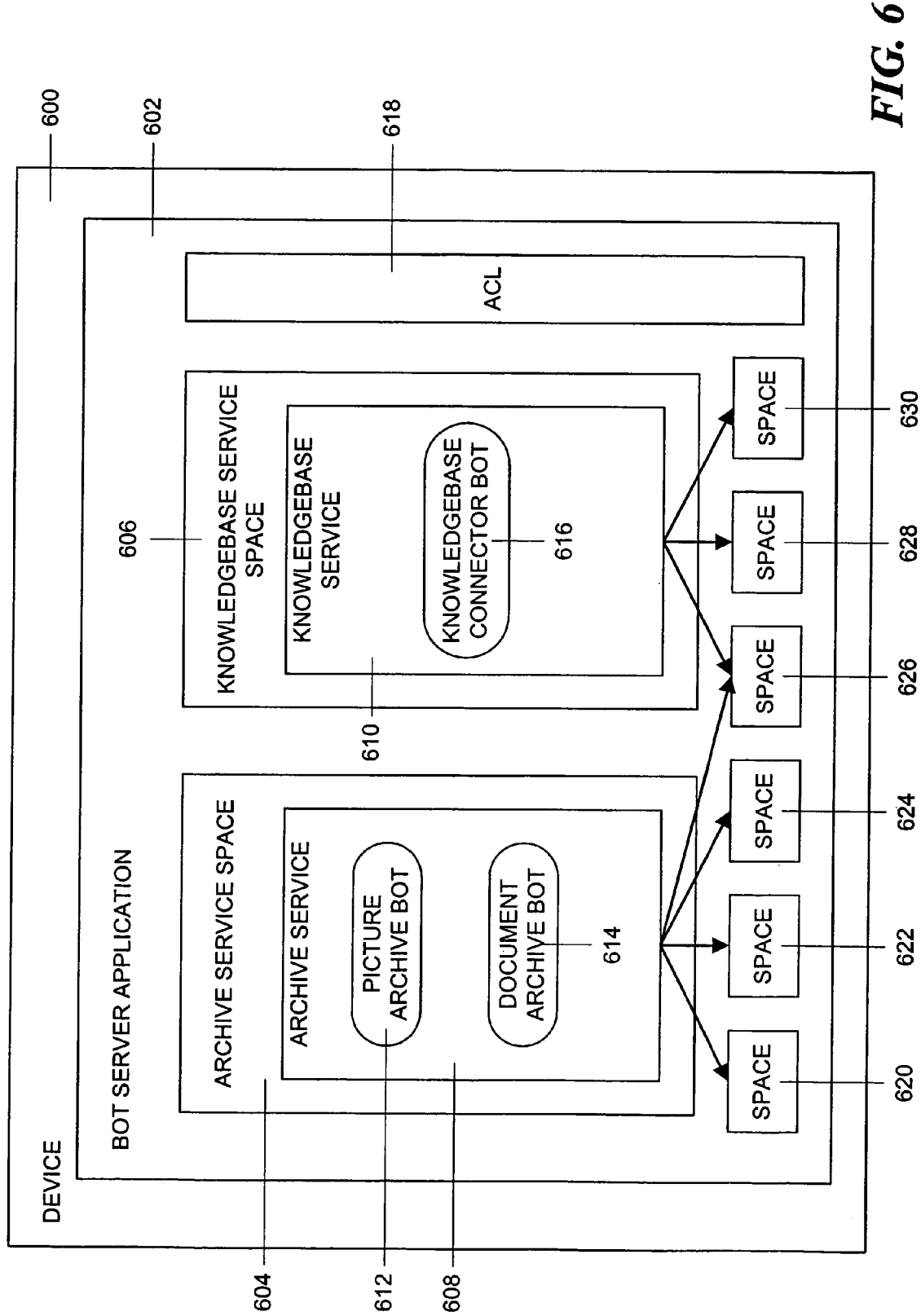
FIG. 6 is a block schematic diagram illustrating the relationship of services, bots and shared spaces in an enterprise integration server constructed in accordance with the principles of the invention.
Figure 7:
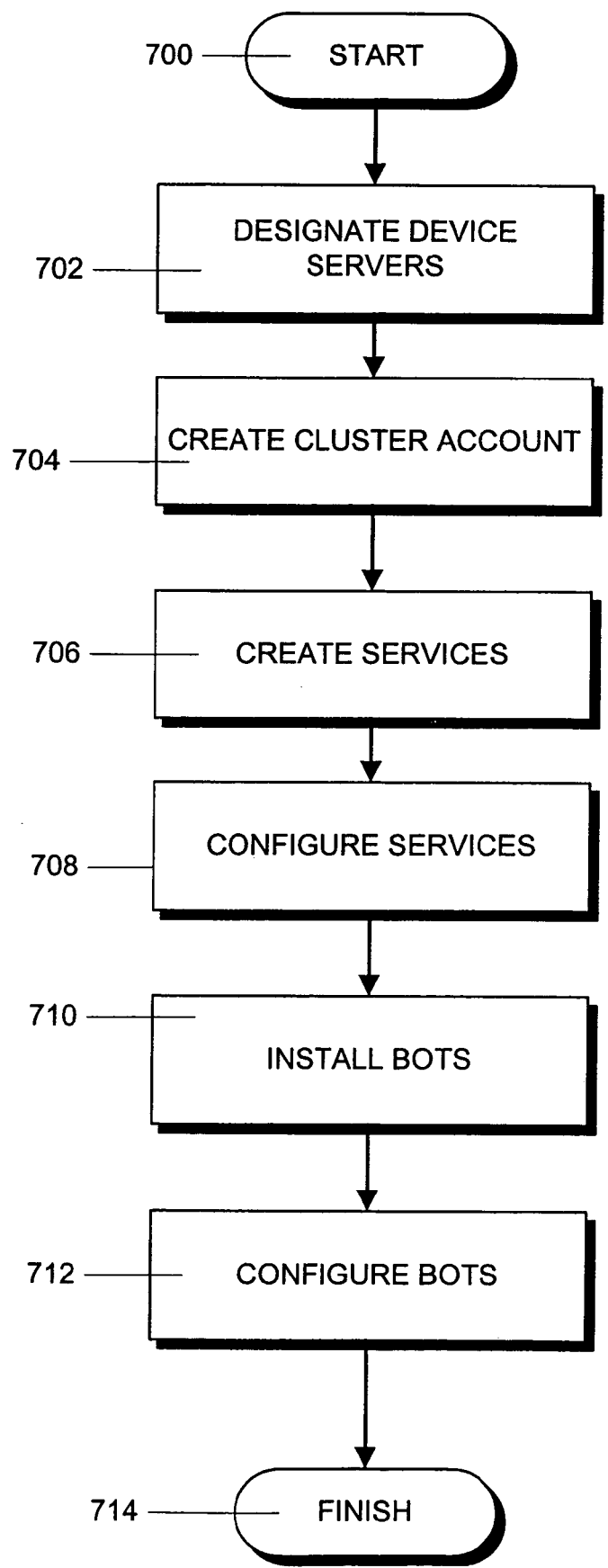
FIG. 7 is a flowchart illustrating the steps in a process of creating and configuring an enterprise integration server.

A block schematic diagram of the relationship between the services and bots in a enterprise integration server is illustrated in FIG. 6 and the steps involved in setting up and configuring the enterprise integration server are illustrated in FIG. 7 that begins in step 700. In order to set up an enterprise integration server, one or more machines are designated to be device servers as shown in step 702. FIG. 6 shows the enterprise integration server housed in a single device 600 although additional devices may be used. The designated devices belong to a virtual "cluster" and so the next step is to establish a cluster account to which the enterprise integration server application 602 will be assigned as illustrated in step 704.

Next, in step 706, the services that comprise the enterprise integration server are created. FIG. 6 illustrates two services that comprise enterprise integration server application 602. These are an archive service 608 and a knowledgebase service 610. As shown in FIG. 6, these services 606 and 610 each reside in their own service space, 604 and 606, respectively, within the enterprise integration server application 602. Although only two services are shown in FIG. 6, more or less services can actually reside in the enterprise integration server application 602. The archive service 608 provides for automatic backup of shared space information. The knowledgebase service can connect to external databases in order to provide information to the shared spaces.

After a service is created, it must be configured as set forth in step 708. The primary role of a service, besides providing a housing for a set of related bots, is to accept or decline invitations to shared spaces. Because the bots operate from within shared spaces, screening shared space invitations is the primary method of controlling bot usage. Accordingly, the service administrator can select the invitation acceptance policy. This selection is one of the four following possible actions:

(1) an invitation is automatically accepted. In this case a corresponding "acceptance message" is automatically generated and routed back to the collaborator that has issued the invitation.

(2) the invitation is accepted only from local trusted contacts. In this case, the service controller determines the sender of the invitation message by extracting the contact information from the message header. A special hash number called a "fingerprint" is generated from the contact information and a query is made into a bot facilitator controller 510 for verification. The facilitator controller 510 compares the fingerprint to a list of trusted contacts in the local contact store 512, which list has been previously established by a service administrator. If a match is found, the invitation is accepted and a corresponding "acceptance message" is generated and routed back to the collaborator that has issued the invitation. If no match is found, then service administration personnel are alerted that the invitation must be manually processed.

(3) the invitation is accepted only from contacts in the access control list 618. In this case, the contact information is extracted from the invitation message header as before and used to query the access control list 618. The access control list can be edited by the service administrator to specify "allowed users" and "denied users". If an allowed user match is found, the invitation is accepted. If a "denied match" is found, a corresponding "invitation declined" message is created and routed back to the collaborator issuing the invitation. All other conditions result in the invitation being left for manual processing by a services administrator.

(4) the invitation is accepted by evoking a custom script. This process provides a means for a services administrator to write software program code (in the form of a scripting language or languages) where the resulting action can be determined programmatically under absolute control of the administrator. This process enables a services administrator to reference any other means of validation which may be needed to comply with the current organizational policies.

The service administrator can also specify the minimum role that the bot service must have in the shared space (as specified in the invitation) in order for the service to accept a shared space invitation from the collaborator. The role settings can be guest (review the shared space data), participant (review and modify the shared space data) or manager (modify the shared space itself.) Role settings complement the acceptance conditions settings described above. For example, to specify that a bot service should accept all invitations that assign a role as manager, the auto-accept condition would be selected as an invitation processing option and "manager" as a minimum role.

Next, in step 710, bots are installed in each service. This step involves associating the bot files with the service. One or more bots can be installed in each service. For example, in FIG. 6, two bots, 612 and 614, have been installed in archive service 608. The picture archive bot 612 stores backup copies of graphic images that are part of the shared space information, while the document archive bot 614 stores backup copies of shared space documents. A single bot 616 has been installed in knowledgebase service 610. Bot 616 is a knowledgebase connector bot that can connect to an external database and transfer information from that database to the shared spaces of which it is a part.

In step 612, the bots may be configured. Although the bot code determines its configuration, the code may allow a service administrator to select certain options and configuration settings that affect the bot's behavior for the current service. For example, a service administrator may be able to specify whether the bot is eligible for invocation when the service to which it belongs is invited to a shared space, the bot shared space role (guest, participant or manager) or who can use the bot. The process then ends in step 614.

After the services have been created and the bots installed, the services may be invited join a shared space by collaborators as discussed below. Shared spaces 620-624 represent shared spaces to which service 608 has been invited and shared spaces 628 and 630 represent the shared spaces to which service 610 has been invited. Note that any or all shared spaces, such as shared space 526, may also invite both services 608 and 610 and other services not shown in FIG. 6.

In accordance with the Groove collaboration system previously described, when an invitation to join a shared space is accepted by a service in the enterprise integration server, the shared space information is sent from one of the collaborators to the service. A local copy of the shared space is then replicated in the enterprise integration server from this information.

In one embodiment of an enterprise integration server, the server itself is not directly accessible from the shared spaces with which it communicates. In order for shared spaces to connect to the server, after the services are created in the server by administrative personnel, the server then broadcasts availability of its services. For example, collaborators connected to a local area network can access the bot service from a local area network contacts list which is populated by the bot facilitator controller 510. It is also possible to notify specific users of a bot service by sending them the service identity information so that they can add the information to their personal contacts list.

However, the way in which a bot service is accessed and handled also depends on the coding of its underlying bots. For example, a service could contain a bot that is programmed to respond to an instant message by creating a shared space and inviting the sender. The bot code can also determine the shared space role of the service (such as manager) and the tools that will be supplied in any shared space to which the service is invited.

Figure 8:
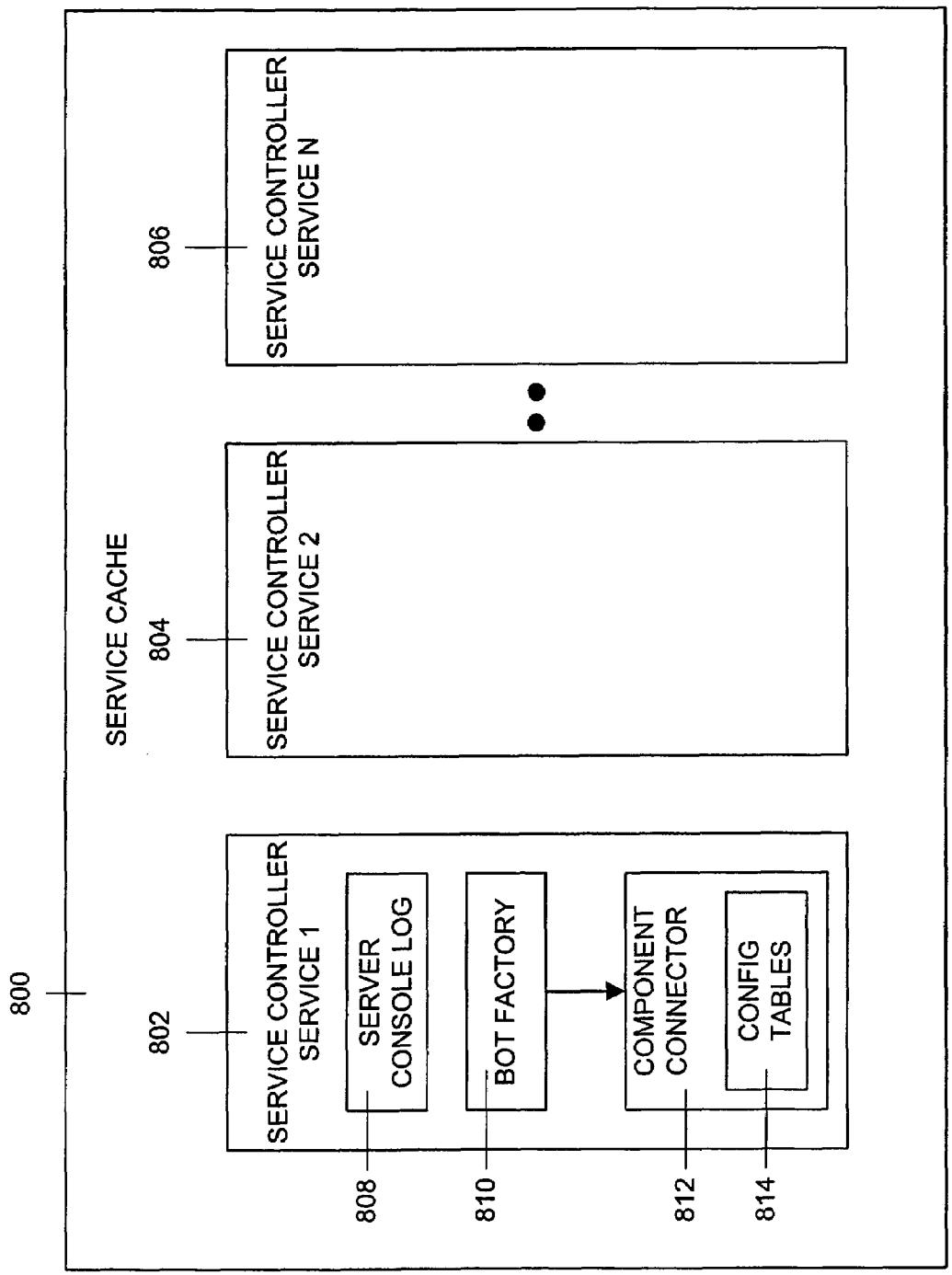
FIG. 8 is a block schematic diagram illustrating the internal architecture of a service cache
Figure 9:
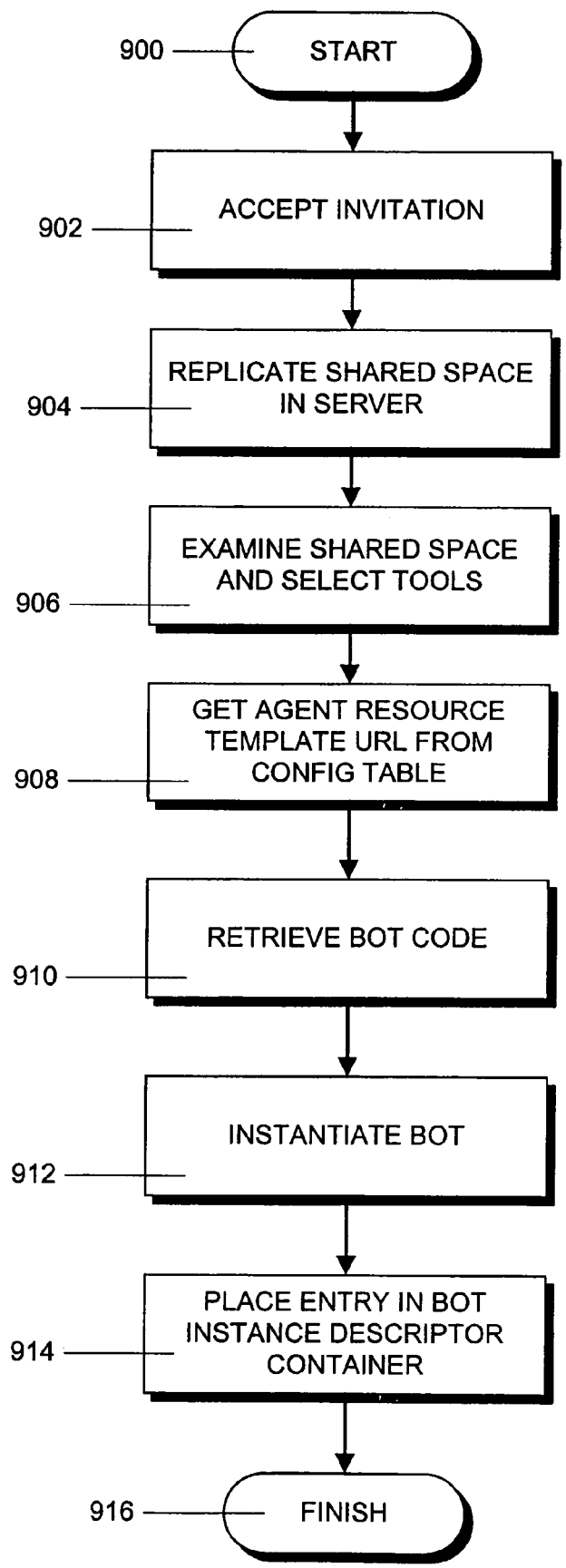
FIG. 9 is a flowchart illustrating the steps of a process in which an invitation to join a shared space is accepted and bots are instantiated to provide the services.

Once the availability of the services has been disseminated to collaborators in shared spaces, the collaborators can then select appropriate services and invite the services into their shared space by sending an invitation message to the server. These invitation messages are processed in accordance with the global invitation policy as discussed above and instances of previously-installed bots are deployed based on the results of this processing. The server architecture that processes an invitation message is shown schematically in FIG. 8 and the steps in the invitation processing are illustrated in the flowchart shown in FIG. 9. As illustrated in FIG. 8, each service has an entry, such as entry 802 in service cache 800 that is maintained by service cache controller 506 (FIG. 5.) As previously mentioned, service cache 800 keeps the services running in the cluster alive and coordinates startup/shutdown of the services. Since there can be multiple services in the server, there may be multiple entries 802-806 in the service cache 800. These entries have an identical internal structure so that, for clarity, only the internal structure of entry 802 is shown in detail.

Each entry, such as entry 802, has a bot service controller that houses a server console log 808 that logs bot service events, a bot factory facility 810 and a component connector facility 812. In addition, the bot service controller 802 processes identity messages, maintains and distributes service configurations and defines service level policies.

The bot factory 810 conducts all bot installation, distribution, and termination activities and maintains bot installation properties and settings. It also manages a scheduling framework and controls the bot instantiations by controlling bot instantiation scope and managing bot instance preferences, persistence and data models. An important function of the bot factory 810 is maintaining the configuration tables 814 in the component connector 812 to allow it to scan shared spaces and select appropriate tools. In particular, as each bot is installed in a service, the bot factory associated with that service examines the activation descriptors in the bot installation files submitted by the developer. As discussed above, each activation descriptor includes information that controls the scanning process. For example, an activation descriptor determines whether tool components that are invisible to the collaborators should be scanned and whether the matching should be performed by URL, category or supported type. Based on this information, the bot factory extracts the appropriate URL, category or supported type information in the activation descriptor signature value and composes a pattern of this information which will be matched by the tool metadata during the scanning process. The bot factory then sends a subscription to the component connector 812 causing the component connector to update its configuration tables 814. In this manner, the bot factory 810 tells the component connector 812 the tools for which it will examine a shared space. In addition, the bot factory also sends subscriptions to the component connector 812 when a bot is changed to allow the component connector to modify its configuration tables accordingly.

The component connector 812 houses the bot factory subscriptions in the form of configuration tables 814 and performs scanning operations on the shared spaces that have been replicated in the server based on the configuration tables 814. In particular, it scans each shared space by opening tool containers extracting the tool metadata therein and decomposing the extracted tool metadata in order to examine the template resource URL data, the category data or the tool type. It may also open tool sub-containers and extract tool information therein. It then uses the information obtained to perform pattern matching between the tool metadata and the configuration tables in order to identify tools with metadata that matches patterns in the configuration tables.

The processing of an invitation received from a shared space begins in step 900 and proceeds to step 902 where the global invitation message acceptance policy discussed above is consulted to decide whether the invitation should be accepted. As previously mentioned, the invitation decision is determined by a selection made by a service administrator at the time that the service was created. The invitation is processed by the components in the service cache entry that corresponds to the service that was invited to join the shared space. Assume for purposes of this discussion that this service is represented by entry 802. Thus, the service controller 802 will determine whether the invitation will be accepted and will return an appropriate "accept" or "decline" message to the collaborator who generated the invitation. The result of this consultation is also stored in a record that defines the appropriate action to be taken later by the bot service controller 802 as described below.

Assuming that the invitation is accepted in step 902, in step 904, a local copy of the shared space of the collaborator that issued the invitation is constructed in the server in accordance with the normal operation of the collaboration system. These local copies are shown as shared spaces 620-630 in FIG. 6.

After a shared space is replicated in the server, it is examined in step 906 by the component connector 812 to detect tools that require a bot to be instantiated. This information allows bots to be bound to tools in the replicated shared space based on the results of this examination. In particular, the component connector 814 uses the configuration tables 814, which may be in the form of a binary map, to look for selected URLs and attributes. Based on subscription information from the bot factory 810, the map includes configuration rules for each tool that are patterns of the URLs and attributes that identify tools that require one or more bots to be instantiated. For each tool that is detected during the scan, the component connector 812 sequentially applies each rule in order to determine whether the tool meet the configuration rule. When a pattern detected during the scan matches a pattern stored in the map, the tool is selected and the component connector 812 notifies the bot factory 810.

The bot factory 810 may also notify other services that a tool has been detected. However, services also have identities that correspond to account holder keys so that the system can scan at the account level. In this case, the server controller 502 determines which service is allowed to see the scan results. Thus, not every service scans all spaces.

When the bot factory 810 receives a notification from the component connector 812 that a tool has been detected with a signature that matches one of the activation descriptor signatures, it makes a decision whether a bot will be instantiated. This decision is based on a number of factors. One factor is whether there is an existing instance of the same bot within the predefined bot scope. As discussed above, the bot scope is determined by a field in the XML bot configuration file. If there is an existing bot within the appropriate scope, then it is used. Bot scopes determine the visibility of a bot. For example, a single bot can have visibility of two shared spaces and thus aggregate data created in each of the spaces. Such a bot can be used with other bots in the shared spaces to form a "security tree" in which one or more bots have access to all data in all shared spaces, but other bots can only access data in the single shared spaces to which they have been invited. A bot can also cross virtual private network boundaries. Further, a bot can be specified to be a participant and thus can read data. It can also modify the space and act as a manager.

Figure 10:
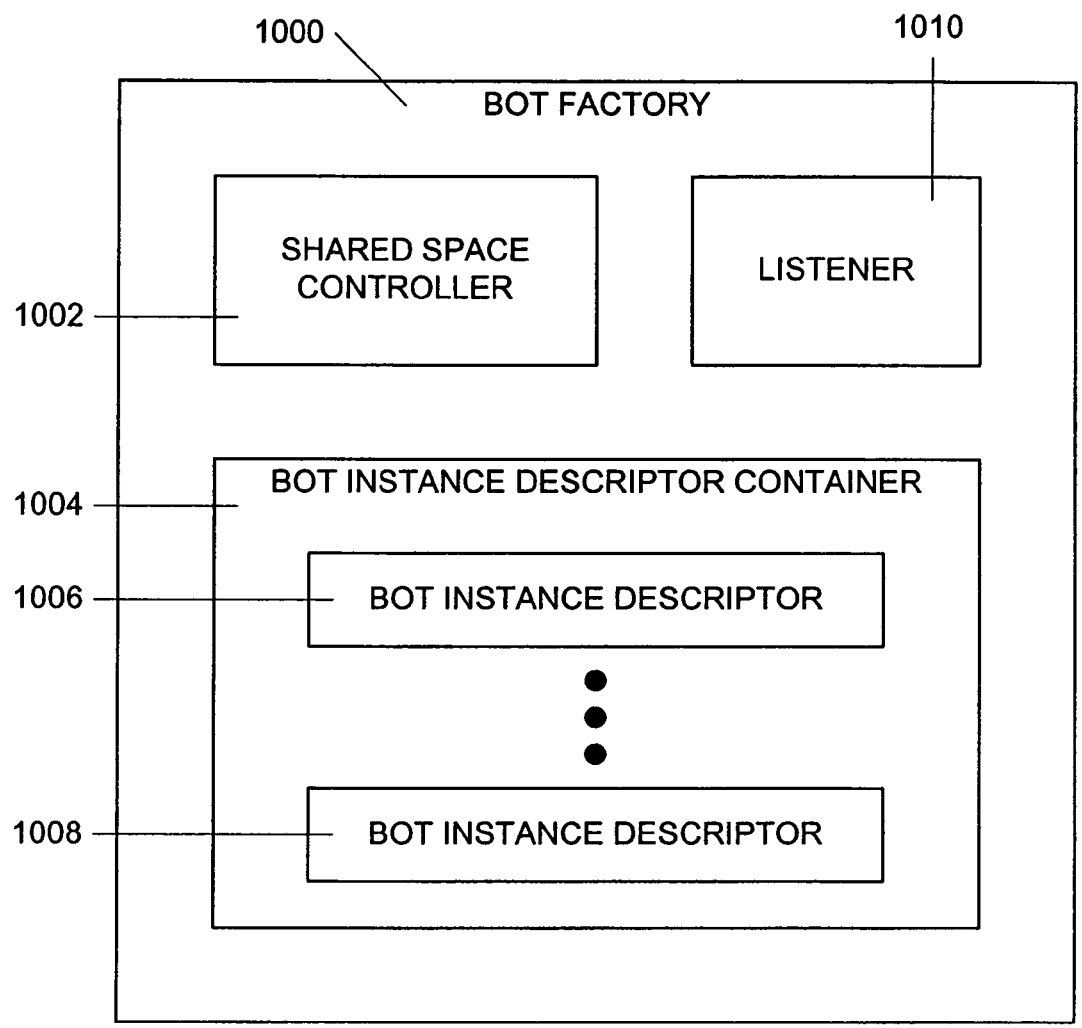
FIG. 10 is a block schematic diagram of the internal architecture of a bot factory.

If an appropriate bot instance is not already in existence, then, the bot factory creates a new bot instance. A more detailed illustration of the internal architecture of a typical bot factory is shown in FIG. 10. Each bot factory 1000 includes a bot factory controller 1002 that coordinates the operation of the bot factory 1000 and further includes a cache of running bots that are kept in a container 1004 called a "bot instance descriptor container". This cache 1004 includes a bot instance descriptor (of which two, 1006 and 1008, are shown) that identifies each bot and ensures that all active bots continue running. Each bot factory 1000 also includes a listener 1010 that listens to each bot instance for status changes that may require the subscription to the component connector to be changed.

The bot factory 1000 further includes a shared space controller for each shared space that it services. Only one such controller 1002 is shown in FIG. 10 for clarity. The controller 1002 is used to monitor the associated shared space for changes in the shared space metadata that might be caused for example, by tools being added or deleted. In the event of such changes, the bot factory 1000 calls the component connector 812 and provides a new subscription outlining the changes. The component connector 812 then notifies the bot factory 1000 whether any changes must be made in the instantiated bots.

Each bot factory 1000 uses installation configuration tables 518 (FIG. 5) that contain the information in the XML configuration files that were provided by the bot developers. These installation configuration tables 518 are created when each bot is installed in the service. The tables 518 include information concerning how the instantiation message invitation is handled and bot access control information. The tables also include information indicating whether there is a service lock at a message store, whether the bots can interact with centralized control, whether there is an automatic scan for tools, basic message texts, such as accept/decline message texts, the number of bot instances, a URL list of all cluster members, a list of bot instances, the installed bot list and a get pointer to each bot instance and a descriptor housed by a cache entry.

In particular, the configuration tables 518 include a URL that indicates the location of the bot software code in a database 516 of agent resource templates. This URL is also called a "component manager URL." When the bot factory 810 makes a decision to create a new instance of a bot, the factory retrieves the URL from the configuration tables in step 908 and uses the URL information find the bot code.

In step 910 of the bot instantiation process, the actual bot code is obtained from a resource database 516 in the enterprise integration server 500. In step 912, the bot is instantiated from the bot code and a bot instance descriptor, such as descriptor 1008, is created by the bot factory controller 1002.

Figure 11:
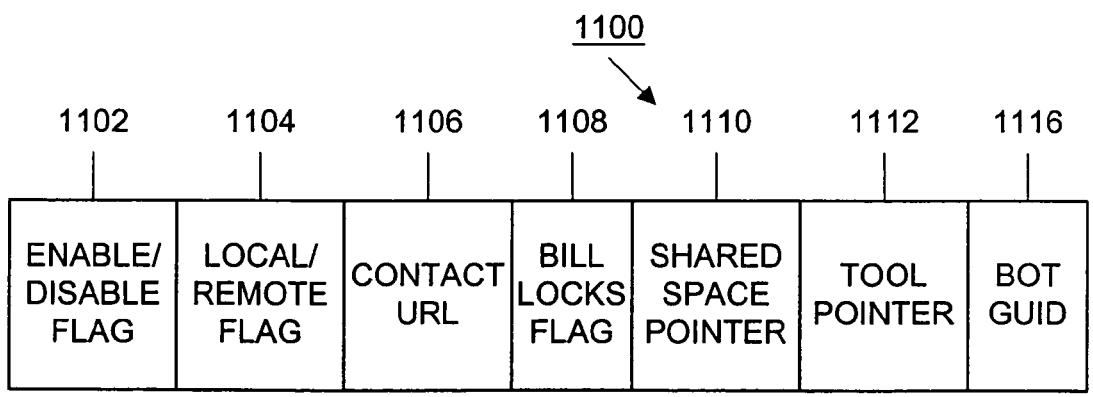
FIG. 11 is a block schematic diagram of a bot instance descriptor illustrating the contents.

The bot instance descriptor 1008 contains the information shown in FIG. 11. This information includes: an enable/disable flag 1102, a local/remote flag 1104, the URL of the contact that created the bot 1106, a flag 1108 that indicates whether billing locks are present, a pointer 1110 to the shared space, a pointer 1112 to the tool and the component attached to the tool and the bot GUID 1014 of the bot type (a GUID is necessary because there can be several bot instances with different run-time properties.) The enable/disable flag 1102 designates a bot that is active or inactive when installed. Inactive bots are ignored by the central control. Inactive bots may be released and may also release the shared space.

In step 914, the bot instance descriptor (1008) is placed in the bot instance descriptor container 1004 in the corresponding bot factory and the process finishes in step 916.

The relationship between a bot and the tool it works with depends on the construction of the tool. For a tool to be "bot-ready", it needs to implement a data model delegate. The data model delegate provides the bot with a well-defined interface to the tool data and events and defines the data structure exposed by the tool. Such an interface is defined in the aforementioned Groove Developer's GDK. If a tool does not define a data model delegate, the only way for another tool to access its data is directly with an engine. However, engines provide general data access mechanisms and would allow a bot or other component to create data that the tool cannot understand. For example, it is possible to use a record set engine in a way that the data stored in each record has different fields. Defining a data model delegate can ensure that all records have the same fields and that the fields are the ones that are used by the tool.

In most cases, a bot can perform its functions communicating with the tool only through the tool's data model delegate. This provides the best isolation between the tool and the bot code because the data model delegate is a published interface that will not change. This minimizes the possibility that a change to the tool implementation will impact the bot's functioning or vice versa. When the bot is communicating with the tool in the server shared space, any information that is sent between the bot and the tool is replicated in the other collaborator's shared space copies in accordance with the normal operation of the collaboration system.

In some cases, bots need additional information about the tool's context. For example, if a bot requires knowledge about the members in a shared space, it can get this information by establishing a connection with the shared space. There are some cases when the bot initiates direct contact with the tool and there are other cases in which the tool initiates contact with the bot. An example of this latter case is a bootstrap bot that is a specialized bot that causes a specified tool to be injected into a shared space to which the bot has been invited.

Typically, when this tool is injected into the shared space, the injected tool will match a bot activation description specified in the bot configuration file and will trigger another companion bot to be activated. Having a tool component in the shared space allows the bot to execute code on the collaborator's device. A bot may need this code to access local data or to distribute the bot processing load. Once the companion bot is running on the enterprise integration server, the companion bot and the tool loaded by the bootstrap bot can connect with each other. In this manner, the enterprise integration server extends selected tools without modifying them by using the server code. However, the data that the code needs is stored outside of the shared space and thus is not accessible in the shared space.

In addition to creating bots in response to invitations from shared spaces, bots may also create shared spaces. As an example, a startup bot referred to as a "shared space creator" can be used to create shared spaces. When the enterprise integration server is started, an instance of this bot is created. This bot instance monitors the transport of an instant messaging system over which the collaborators can communicate and evaluates instant messages that are sent to the server. When an instant message is received at the server requesting the creation of a shared space, the bot performs simple authentication, creates a new shared space, adds designated tools, sets the shared space security policies as determined by the service administrator and, finally, invites the sender of the instant message into the new shared space with the appropriate access level.

The enterprise integration server comprises an administrative console program that allows centralized control of the server, services and bots as previously described. Using the console, an administrator can control the workload of each server device. Each device can be a cluster member and the devices can load balance each other. Manual load balancing by an administrator is also possible. The administrator also has a message area so that when a new tool is detected by the component connector and the tool is not designated as "trusted", a message screen appears and tells the administrator that the tool is there and requests advice as to whether the system should accept and trust the tool.

Figure 12:
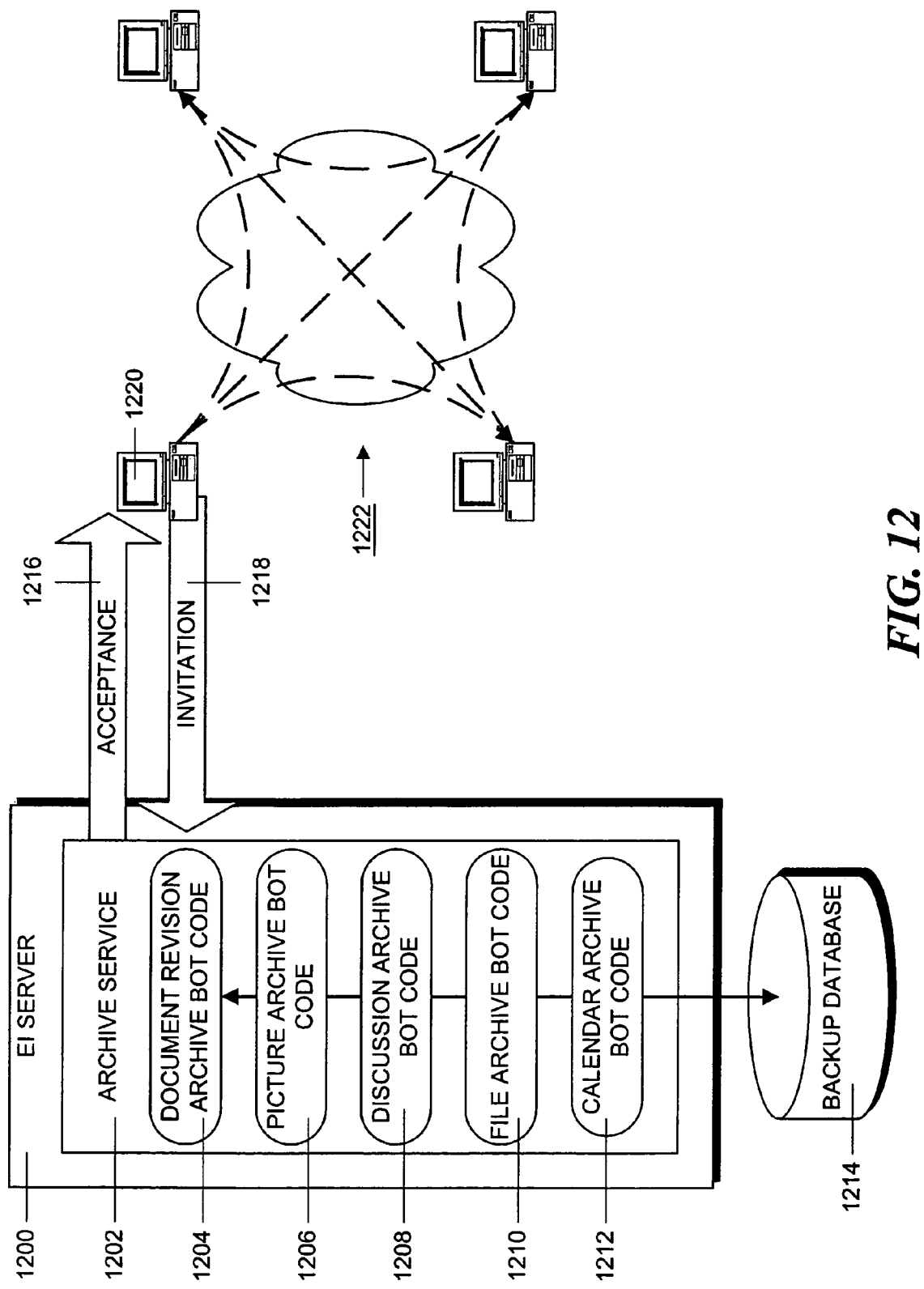
FIG. 12 is a block schematic diagram illustrating the configuration of a simple archive service.
Figure 13:
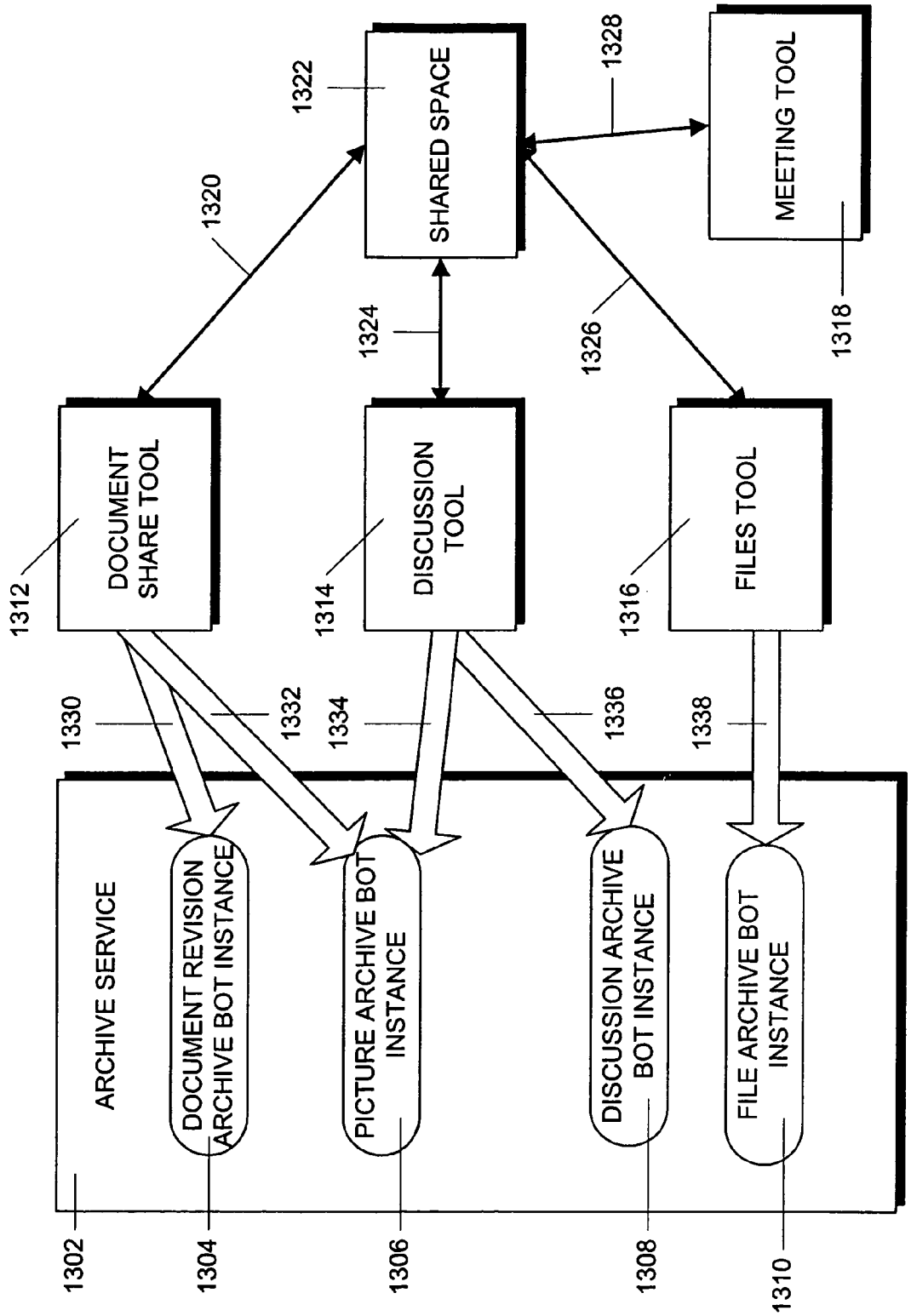
FIG. 13 is a block schematic diagram illustrating the operation of the simple archive service shown in FIG. 12.

FIGS. 12 and 13 schematically illustrate the use of a simple archive service 1202 (FIG. 12) in an enterprise integration server 1200. Archive service 1202 might correspond, for example, to the archive service 608 as illustrated in FIG. 6. In order to use the archive service, the service 1202 and the bot code modules 1204-1212 implementing the service, are first installed in server 1200 as previously described. The bot code might include document revision archive bot code module 1204, picture archive bot code module 1206, discussion archive bot code module 1208, file archive bot code module 1210 and calendar archive bot code module 1212. Each bot code module includes code that allows a bot instance instantiated from the code to transfer information between the bot instance and a backup database 1214.

When the bot code modules 1204-1212 are installed in the archive service 1202, a bot factory (not shown in FIGS. 12 and 13) that is associated with the service 1202 will construct subscriptions from the activation descriptors associated with each bot code module. These subscriptions are sent to the component connector for the service (not shown in FIGS. 12 and 13) and result in scan patterns based on tool signatures, categories and types being entered into configuration files that the component connector uses to locate tools for which bot instances will be instantiated.

In operation, a shared space 1222 is first constructed by a group of collaborators in accordance with the normal operation of a collaboration system used by the collaborators. As shown in FIG. 13, this shared space 1322 illustratively includes a document share tool 1312, a discussion tool 1314, a files tool 1316 and a meetings tool 1318 as schematically indicated by arrows 1320, 1324, 1326 and 1328, respectively. The document share tool 1312 allows each of the collaborators to view and edit a shared document and produces daily document revisions. The discussion tool 1314 allows the collaborators to carry on an on-screen discussion regarding the document. The files tool 1316 allows the collaborators to retrieve and save files and the meetings tool 1318 allows the collaborators to schedule meetings.

During the collaboration, one of the collaborators 1220 sends an invitation to the archive service in server 1200 as indicated schematically by arrow 1218. This invitation would be addressed to the archive service 1202 and would specify the role in the shared space that the service will have. For example, the invitation might specify that the archive service can join the shared space as a participant.

The archive service 1202 receives the invitation and processes it in accordance with the policies that have been determined by the service administrator as previously described. In particular, unless the service automatically accepts all invitations, the collaborator who sent the invitation must be on the list of trusted contacts or designated as a contact capable of generating such an invitation in the server access control list. In addition, the service must allow acceptance of an invitation that allows it to join a shared space as a participant. If all of these conditions are met, the archive service accepts the invitation and forwards an acceptance message to collaborator 1220 as schematically illustrated by arrow 1216.

As previously described, the acceptance causes the shared space 1222 to be replicated in the archive service 1202 including the tools (1312-1318.) When the shared space is created in the archive service 1202, the component connector associated with service scans the shared space for tools with signature, categories or types that match its scan patterns stored when the bot code was installed. When a match is found a corresponding bot instance is either instantiated and linked to the tool or an existing bot instance linked to the tool.

For example, FIG. 13 illustrates the state of the system after the scan has been conducted and appropriate bots instantiated or linked. Illustratively, four bot instances have been created. These include the document revision archive bot instance 1304, the picture archive bot instance 1306, the discussion archive bot instance 1308 and the file archive bot instance 1310. It should be noted that no bot instance was instantiated from the calendar archive bot code 1212 because the shared space did not include a tool that required such a bot to be instantiated. Similarly, no bot was instantiated for meeting tool 1318 because the archive service 1302 did not include archive bot code for this tool.

Document share tool 1312 is shown linked to the document revision archive bot instance 1304 and the picture archive bot instance 1306 as schematically illustrated by arrows 1330 and 1332. This linking would occur because the installation descriptors of both bot code modules specified a match for the document share tool. Similarly, the discussion tool 1314 is linked to the picture archive bot instance 1306 and the discussion archive bot instance 1308 as indicated schematically by arrows 1334 and 1336. Although two separate tools 1312 and 1314 are linked to bot instance 1306, only a single bot instance is created as specified by the bot installation code.

Finally, files tool 1316 is linked to file archive bot instance 1310 as indicated by arrow 1338. At this point, the archive bot instances will automatically store backup information generated during the operation of the shared space 1322. It should also be noted that the links between tools 1312-1316 and archive bot instances 1304-1310 are created automatically, and in most cases without knowledge of the collaborators in the shared space 1322.

Figure 14:
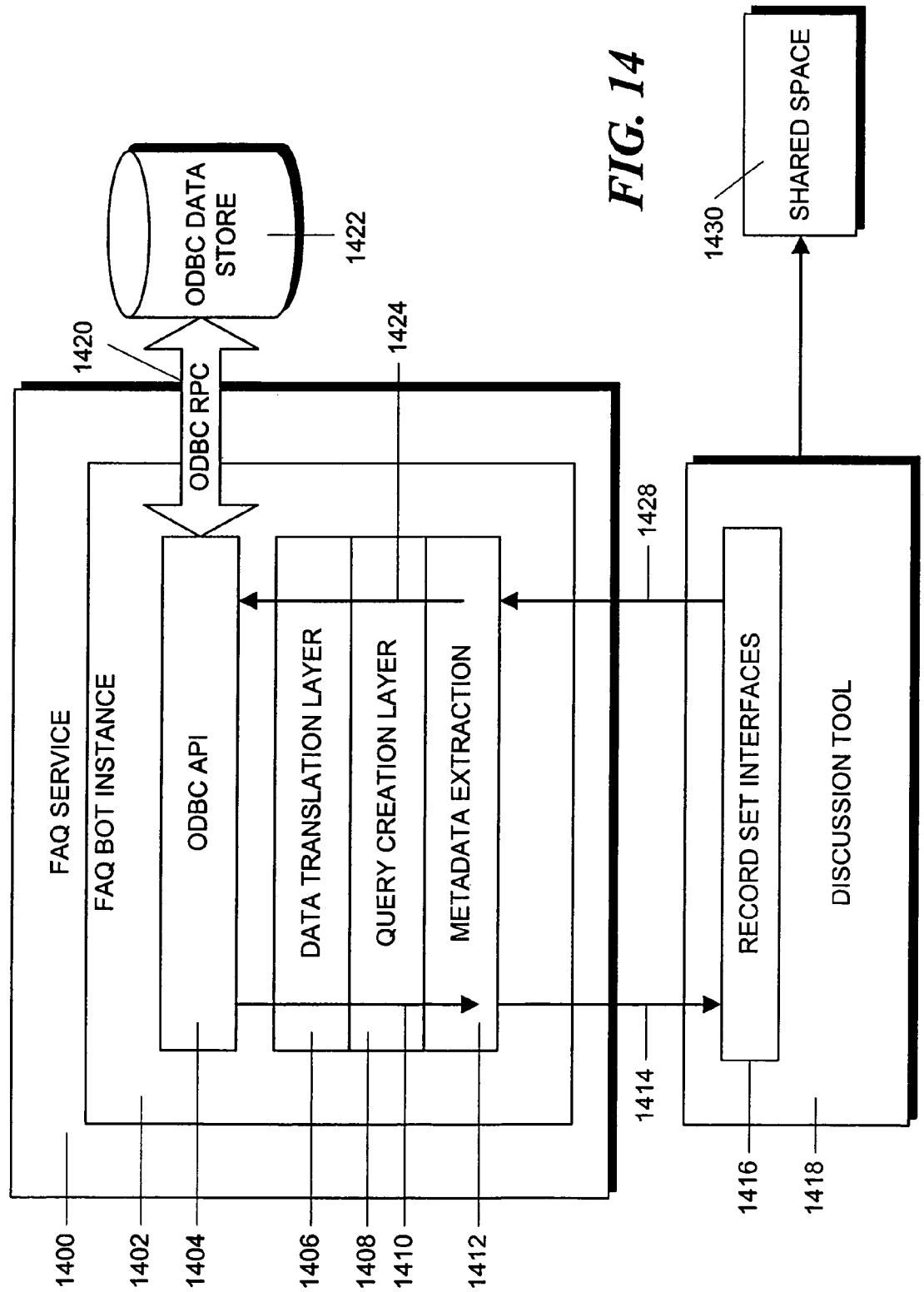
FIG. 14 is a block schematic diagram illustrating the operation of an example FAQ bot.

FIG. 14 illustrates the operation of a FAQ service that, in response to questions posed during a collaborative discussion, provides responses based on database information. In order to use the FAQ service, a collaborator who is part of a shared space, invites the FAQ service into a shared space includes the discussion tool. For example, as shown in FIG. 14, a collaborator in shared space 1430 that includes discussion tool 1418 might invite the FAQ service 1400 into shared space 1430. FAQ bot code would have been previously installed in the FAQ service 1400. A sample installation configuration for such a FAQ bot is shown below. This configuration file specifies a single bot installation with a single activation descriptor:

```
<BotInstallations>
    <BotInstallation
    Active="1"
    Class="1"
    AgentTemplateResourceURL="http://components.yourcompany.com/GDK/
        Samples/Bots/FAQ/JavaScript/GrooveFAQBot.osd?Package=
        com.yourcompany.GDK.Samples.Bots.FAQ.
        JavaScript.GrooveFAQBot_TPL&Version=0,2&Factory=Open"
    DisplayName="FAQBot (JavaScript/Access Integration)"
    MinScope="2"
    MinTelespaceRole="1"
    <ActivationDescriptors>
        <ActivationDescriptor
            IncludeInvisible="1"
            SignatureType="0"
            ToolConnectionType="0"
            Signature="http://components.groove.net/Groove/Components/
            Root.osd?Package=net.groove.Groove.Tools.General.Discussion.
            DiscussionTemplate_TPL&Version=3&Factory=Open"
        />
    </ActivationDescriptors>
    />
</BotInstallations>
```

Note that the tool signature requires that the discussion tool be present for a FAQ bot instance to be created. The invitation to a shared space 1430 containing a discussion tool 1418 will result in a FAQ bot instance 1402 being created or the discussion tool 1418 being linked to an existing FAQ bot instance as described above.

The FAQ bot instance 1402 will contain code that connects it to an ODBC data store 1422 that contains a database of FAQ questions. This requires a data source name (DSN) connection to the database 1422 on the enterprise integration server (not shown in FIG. 14) so that the FAQ Bot instance 1402 can interact with it.

The discussion tool 1418 exposes a record set interface from its record set interface as indicated schematically as 1416. This allows the FAQ bot instance 1402 to read new discussion topics through the record set interface 1416. In order to connect to the data model delegate of the discussion tool 1418, the FAQ bot would include code such as the following:

```
function MyCreateBotInstance(i_BotInstanceDescriptor,
    i_NewInstance)
{
    var pIDelegateComponent =
```

```
        i_BotInstanceDescriptor.OpenBotInstance( ).Component;
        ScriptHostComponent.Advise(pIDelegateComponent,
            "{72C3A310-46F1-11D4-80BB-0050DA5F08E3}");
}
```

Since the discussion tool's data model delegate exposes the underlying record set engine, the call to Advise requests the guaranteed unique ID (GUID) for the IGrooveRecordSetListener interface.

The discussion topics retrieved by the FAQ bot are provided to a metadata extraction layer 1412 in the FAQ bot instance 1402 as indicated schematically be arrow 1428. The metadata extraction layer 1412 parses the topics and extracts words from a topic subject line. The extracted words are provided to query creation layer 1408 and data translation later 1406 to the ODBC API layer 1404 as schematically indicated by arrow 1424.

The query translation layer 1408 uses the extracted words as keywords to create a generic SELECT statement. In layer 1406, this SELECT statement is translated into a data-specific form suitable for accessing database 1422. The SELECT command statement is provided to an ODBC API layer that performs the query on the database 1422, via a suitable mechanism such as a remote procedure call (RPC) illustrated schematically by arrow 1420.

The records returned from the database 1422, via the RPC 1420, are provided to the ODBC API and from there to the data translation layer 1406 where they are reformatted into a form suitable for use with the record set interface 1416. The reformatted records are then provided to the record set interface 1416, as schematically indicated by arrow 1410, so that they generate response topics in the discussion tool 1418.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although a peer-to-peer collaboration system has been illustrated in the detailed description, the inventive concepts also apply to a collaboration system in which the collaborators exchange information via a server. In this case, an enterprise integration service could be created on the existing server. This service could be created via an invitation as described above or, alternatively, the appropriate bot factories and associated software could be installed on the server when the collaborative system is initially created. In this latter case, a shared space is also created in the server when the collaborative system is created and used to update a file system copy of the shared space. This shared space can then be examined for tools that require connection to an external system.

What is claimed is:

1. A method for connecting a collaboration system to a system external to the collaboration system, the collaboration system allowing collaboration between a plurality of collaborating members, each collaborating member interacting with a collaborating computer, the collaboration system also being adapted for each collaborating member to use tools to modify a local copy of a shred space on a collaborating computer, and each collaborating computer communicating data change requests representing changes to the copy of the shared space on the collaborating computer to other collaborating computers, and each collaborating computer being configured with a dynamics manager, the dynamics manager examining data change requests received from other collaborating computers, coordinating the execution of the data change requests, and directing a data-change engine to make changes to the copy of the shared space on the collaborating computer based on the data change requests, the method comprising:
   (a) replicating on a server a copy of an existing shared space based on information obtained from at least one collaborating member of the plurality of collaborating members;
   (b) creating on the server an agent for a tool, the tool requiring a connection to the external system;
   (c) using the agent to exchange data between the external system and the tool;
   (d) modifying, with the tool, the copy of the shred space on the server based on the exchanged data; and
   (e) communicating data change requests representing the modifications to the copy of the shred space on the server to a plurality of the collaborating computers.

2. The method of claim 1 wherein step (a) comprises creating the server shared space copy in the server in response to an invitation from one collaborating member, the shared space reflecting communication among the plurality of collaborating members made prior to replicating the copy of the shared space.

3. The method of claim 1 wherein step (a) comprises creating the server shared space copy in the server when the collaboration system is created.

4. The method of claim 1, further comprising discovering at least one tool in the copy of the shred space on the server and scanning each of the at least one tool discovered in the server shared space copy to discover tools contained within the each of the at least one tool.

5. The method of claim 1, further comprising creating a map from information that identifies each tool that requires connection to the external system and scanning the server shared space copy to locate tools therein and comparing information from located tools to the information in the map to identify the tool requiring the connection to the external system.

6. The method of claim 1, wherein step (b) comprises creating an agent for each of a plurality of tools that:
   i) requires connection; and
   ii) does not already have an associated agent.

7. The method of claim 1 wherein:
   the plurality of collaborating computers comprises computers of members that are not authenticated to the external system;
   the collaboration system comprises a security framework for exchanging information between the plurality of collaborating computers; and
   the communicating data change requests comprises communicating data change requests to in accordance with the security framework.

8. The method of claim 1, wherein step (c) further comprises using the agent to exchange archive data between the external system and the tool.

9. Apparatus for connecting a collaboration system to a system external to the collaboration system, the collaboration system allowing collaboration between a plurality of collaborating members, each collaborating member interacting with a collaborating computer using tools to modify a local copy of a shared space on the collaborating computer, and each collaborating computer communicating data change requests representing changes to the copy of the shared space on the collaborating computer to the other collaborating computers and making changes to the copy of the shred space on the collaborating computer in response to data change requests received from the other collaborating computers, the apparatus comprising:
   means for copying the shred space to a server comprising at least one processor, the shared space reflecting communication among the plurality of collaborating members made prior to copying the shared space, wherein the means comprises a computer storage medium comprising computer executable instructions for execution on a processor of the at least one processor;
   means for creating a first activity and at least a second activity, the first and second activity each interacting with a shared space copy on the server, wherein the means comprises a computer storage medium comprising computer executable instructions for execution on a processor of the at least one processor;

means for creating an agent for a tool operating within the first activity, the agent exchanging data between the external system and the tool, wherein the means comprises a computer storage medium comprising computer executable instructions for execution on a processor of the at least one processor;

means for associating the agent with the tool such that the agent exchanges the data between the external system and the tool, wherein the means comprises a computer storage medium comprising computer executable instructions for execution on a processor of the at least one processor;

means for sending data change requests representing changes to the copy of the shared space made by a first engine means to a plurality of the collaborating members, the means for sending being responsive to the first engine means, wherein the means comprises a computer storage medium comprising computer executable instructions for execution on a processor of the at least one processor; and means for receiving data change requests from others of the plurality of collaborating members, wherein:

the means comprises a computer storage medium comprising computer executable instructions for execution on a processor of the at least one processor;

the first activity comprises a first engine for interfacing to the tool to apply changes to the shared space copy, the changes being generated by the tool in response to the data; and the second activity comprises a second engine for applying changes to the shared space copy based on received data change requests; and at least one of the means for copying, means for creating and means for associating comprises computer instructions stored on a tangible computer-readable storage medium.

10. The apparatus of claim 9 wherein the means for copying comprises means for creating the server shared space copy in the server in accordance with a security framework and in response to an invitation from one collaborating member.

11. The apparatus of claim 9 wherein the means for copying comprises means for creating the server shared space copy in the server when the collaboration system is created.

12. The apparatus of claim 9 further comprising means for discovering at least one tool in the copy of the shred space and means for scanning each of the at least one discovered tools in the server shred space copy to discover tools contained within the each tool.

13. The apparatus of claim 9 further comprising means for creating a map from information that identifies each tool that requires connection to the external system and means for scanning the server shared space copy to locate tools therein and means for comparing information from located tools to the information in the map to identify tools that require connection to the external system.

14. The apparatus of claim 9 wherein the agent creating means comprises means for creating an agent for each tool that:

i) requires connection, and ii) does not already have an associated agent.

15. The apparatus of claim 9 wherein the associating means comprises means for associating a single agent with a plurality of tools.

16. The apparatus of claim 9 further comprising means for linking each agent to the tool with which the agent is associated in order to exchange data between the external system and the associated tool.

17. The apparatus of claim 9 further comprising means for repeatedly scanning the server shared space copy to locate tools added to the server shared space copy after an initial scanning.

18. A method for connecting a collaboration system to a system external to the collaboration system, the collaboration system being adapted to allow collaboration between a plurality of collaborating members, each collaborating member interacting with a collaborating computer, the collaboration system also being adapted for each collaborating member to use tools to modify a local copy of a shared space on a collaborating computer, and each collaborating computer communicating data change requests representing changes to the copy of the shared space on the collaborating computer to other collaborating computers and making changes to the copy of the shared space on the collaborating computer in response to data change requests received from other collaborating computers, the method comprising:

(a) on a server, receiving an invitation from a collaborating member, consulting an invitation acceptance policy, and accepting the invitation in response to the consulting;

(b) in response to accepting the invitation, replicating on the server a copy of the shared space;

(c) determining on the sewer whether an appropriate agent is in existence and when an appropriate agent is not in existence, in response to the determining creating an agent associated with a tool, the tool requiring a connection to the external system;

(d) using the agent to exchange data between the external system and the tool;

(e) making changes to information within the shared space generated by at least one of the plurality of collaborating members;

(f) making changes, with the tool, to information within the copy of the shared space on the server based on the exchanged data; and (g) communicating data change requests representing the changes to the copy of the shared space on the server to a plurality of the collaborating computers.

19. The method of claim 18, wherein data exchanging with the external system comprises exchanging data with at least one of an external calendar, a knowledge management archive or a customer relationship management (CRM) system.

20. The method of claim 18, wherein the collaboration system is adapted to support a chat activity, and the communicating data change requests comprises communicating data change requests separate from the chat activity.

* * * * *